(12) United States Patent
Ivri

(10) Patent No.: US 9,068,566 B2
(45) Date of Patent: *Jun. 30, 2015

(54) PIEZOELECTRIC DISPENSER WITH A LONGITUDINAL TRANSDUCER AND REPLACEABLE CAPILLARY TUBE

(75) Inventor: Yehuda Ivri, Newport Coast, CA (US)

(73) Assignee: BioDot, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/355,150

(22) Filed: Jan. 20, 2012

(65) Prior Publication Data

US 2012/0304929 A1  Dec. 6, 2012

Related U.S. Application Data

(60) Provisional application No. 61/632,842, filed on Nov. 11, 2011, provisional application No. 61/461,664, filed on Jan. 21, 2011.

(51) Int. Cl.
*B01L 3/02* (2006.01)
*F04B 43/09* (2006.01)
(Continued)

(52) U.S. Cl.
CPC .............. *F04B 43/046* (2013.01); *F04F 7/00* (2013.01); *B05B 15/061* (2013.01); *B05B 17/0607* (2013.01); *B05B 17/0623* (2013.01); *B01J 2219/00378* (2013.01)

(58) Field of Classification Search
CPC .............. G01N 35/10; G01N 35/1002; G01N 2035/1035; G01N 1/14; F04B 43/046; B05B 17/0607; B05B 15/061; B01J 2219/00378

USPC .......... 422/501, 509, 518, 521–522; 73/863.32, 864, 864.11, 864.42; 417/413.2

See application file for complete search history.

(56) References Cited

U.S. PATENT DOCUMENTS 2,264,564 A    12/1941  Connor
2,512,743 A     6/1950  Hansell
(Continued)

FOREIGN PATENT DOCUMENTS

DE    40 41 892 A1    7/1991
DE    197 54 000 A1    6/1999
(Continued)

OTHER PUBLICATIONS

Deerac Fluidics, New Horizons in Low-Volume Liquid Handling—Technology, printed from the internet on Jan. 17, 2008, 3 pp.
(Continued)

*Primary Examiner* — Brian R Gordon
(74) *Attorney, Agent, or Firm* — Knobbe, Martens, Olson & Bear, LLP

(57) ABSTRACT

Systems, devices and methods are provided, for acquiring and dispensing predetermined volumes of liquids and, in particular, to a unique piezoelectric dispenser for acquiring and dispensing of small volumes of fluid in an automatic or manual production of DNA arrays and assays, wherein droplets are dispensed in a single drop format with volumes that may range from about a few picoliters to several nanoliters. The dispenser can advantageously utilize a disposable capillary tube assembly while desirably retaining the piezoelectric actuator for subsequent further uses, thereby mitigating the possibility of cross contamination of fluids and providing an economical and cost effective approach with reuse of the piezoelectric actuator for further operation such as with a variety of liquids to be dispensed and transferred. A unique longitudinal transducer can transmit radial tube displacement into controlled axial motion of the tube.

28 Claims, 11 Drawing Sheets

(51) Int. Cl.
*B05C 5/00* (2006.01)
*F04B 43/04* (2006.01)
*F04F 7/00* (2006.01)
*B05B 15/06* (2006.01)
*B05B 17/06* (2006.01)

(56) References Cited

U.S. PATENT DOCUMENTS

| | | |
|---|---|---|
| 3,373,437 A | 3/1968 | Sweet et al. |
| 3,452,360 A | 6/1969 | Williamson |
| 3,512,173 A | 5/1970 | Damouth |
| 3,673,857 A * | 7/1972 | Teitelbaum ............... 73/40.5 A |
| 3,683,212 A | 8/1972 | Zoltan |
| 3,946,398 A | 3/1976 | Kyser et al. |
| 4,018,383 A | 4/1977 | Paton et al. |
| 4,040,885 A * | 8/1977 | Hight et al. ............... 156/378 |
| 4,065,969 A * | 1/1978 | Dinwiddie ............... 73/727 |
| 4,090,404 A * | 5/1978 | Dupont et al. ........... 73/114.43 |
| 4,121,466 A | 10/1978 | Reichler et al. |
| 4,199,013 A | 4/1980 | Reich et al. |
| 4,223,558 A | 9/1980 | Schmider et al. |
| 4,278,205 A | 7/1981 | Binoche |
| 4,369,664 A | 1/1983 | Bunce et al. |
| 4,478,094 A | 10/1984 | Salomaa et al. |
| 4,492,322 A | 1/1985 | Hieftje et al. |
| 4,533,082 A | 8/1985 | Maehara et al. |
| 4,555,957 A | 12/1985 | Frankel et al. |
| 4,681,742 A | 7/1987 | Johnson et al. |
| 4,717,049 A | 1/1988 | Green et al. |
| 4,748,043 A | 5/1988 | Seaver et al. |
| 4,877,745 A | 10/1989 | Hayes et al. |
| 4,922,852 A | 5/1990 | Price |
| 4,926,701 A | 5/1990 | Tompkins |
| 4,944,922 A | 7/1990 | Hayashi |
| 5,004,159 A | 4/1991 | Kistner |
| 5,041,266 A | 8/1991 | Fox |
| 5,045,069 A | 9/1991 | Imparato |
| 5,056,462 A | 10/1991 | Perkins et al. |
| 5,132,097 A | 7/1992 | Van Deusen et al. |
| H1099 H | 9/1992 | Sayler |
| 5,152,456 A | 10/1992 | Ross et al. |
| 5,164,740 A | 11/1992 | Ivri |
| 5,257,657 A | 11/1993 | Gore |
| 5,320,250 A | 6/1994 | La et al. |
| 5,324,480 A | 6/1994 | Shumate et al. |
| 5,334,353 A | 8/1994 | Blattner |
| 5,338,688 A | 8/1994 | Deeg et al. |
| 5,447,864 A | 9/1995 | Raybuck et al. |
| 5,486,337 A | 1/1996 | Ohkawa |
| 5,505,777 A | 4/1996 | Ciardella et al. |
| 5,509,966 A | 4/1996 | Sykes |
| 5,518,179 A | 5/1996 | Humberstone et al. |
| 5,525,515 A | 6/1996 | Blattner |
| 5,529,756 A | 6/1996 | Brennan |
| 5,542,289 A | 8/1996 | Hool et al. |
| 5,558,838 A | 9/1996 | Uffenheimer |
| 5,586,550 A | 12/1996 | Ivri |
| 5,589,550 A | 12/1996 | Manley et al. |
| 5,593,839 A | 1/1997 | Hubbell et al. |
| 5,593,893 A | 1/1997 | Kobashi et al. |
| 5,601,980 A | 2/1997 | Gordon et al. |
| 5,601,982 A | 2/1997 | Sargent et al. |
| 5,621,443 A | 4/1997 | Buschulte et al. |
| 5,636,788 A | 6/1997 | Wilson |
| 5,650,506 A | 7/1997 | Woodard et al. |
| 5,658,802 A | 8/1997 | Hayes et al. |
| 5,707,588 A | 1/1998 | Tsukishima |
| 5,711,989 A | 1/1998 | Ciardella et al. |
| 5,738,728 A | 4/1998 | Tisone |
| 5,741,554 A | 4/1998 | Tisone |
| 5,742,304 A | 4/1998 | Richtsmeier et al. |
| 5,743,960 A | 4/1998 | Tisone |
| 5,744,305 A | 4/1998 | Fodor et al. |
| 5,747,102 A | 5/1998 | Smith et al. |
| 5,750,881 A | 5/1998 | Dorenkott et al. |
| 5,756,050 A | 5/1998 | Ershow et al. |
| 5,758,637 A | 6/1998 | Ivri et al. |
| 5,763,278 A | 6/1998 | Sickinger et al. |
| 5,770,151 A | 6/1998 | Roach et al. |
| 5,770,160 A | 6/1998 | Smith et al. |
| 5,785,926 A | 7/1998 | Seubert et al. |
| 5,807,522 A | 9/1998 | Brown et al. |
| 5,811,306 A | 9/1998 | Komatsu |
| 5,853,894 A | 12/1998 | Brown |
| 5,886,716 A | 3/1999 | Heinzl et al. |
| 5,916,524 A | 6/1999 | Tisone |
| 5,925,732 A | 7/1999 | Ecker et al. |
| 5,927,547 A | 7/1999 | Papen et al. |
| 5,938,117 A | 8/1999 | Ivri |
| 5,958,342 A | 9/1999 | Gamble et al. |
| 5,967,202 A | 10/1999 | Mullen et al. |
| 5,981,733 A | 11/1999 | Gamble et al. |
| 5,985,214 A | 11/1999 | Stylli et al. |
| 5,999,949 A | 12/1999 | Crandall |
| 6,003,678 A | 12/1999 | Van den Engh |
| 6,004,617 A | 12/1999 | Schultz et al. |
| 6,014,970 A | 1/2000 | Ivri et al. |
| 6,044,212 A | 3/2000 | Flavin et al. |
| 6,062,212 A | 5/2000 | Davison et al. |
| 6,063,339 A | 5/2000 | Tisone et al. |
| 6,070,973 A | 6/2000 | Sachs et al. |
| 6,079,283 A * | 6/2000 | Papen et al. ............... 73/864.11 |
| 6,083,762 A | 7/2000 | Papen et al. |
| 6,085,740 A | 7/2000 | Ivri et al. |
| 6,100,030 A | 8/2000 | McCasky Feazel et al. |
| 6,103,479 A | 8/2000 | Taylor |
| 6,114,178 A | 9/2000 | Dezael et al. |
| 6,121,048 A | 9/2000 | Zaffaroni et al. |
| 6,143,252 A | 11/2000 | Haxo, Jr. et al. |
| 6,150,173 A | 11/2000 | Schubert |
| 6,168,915 B1 | 1/2001 | Scholl et al. |
| 6,179,584 B1 | 1/2001 | Howitz et al. |
| 6,203,759 B1 | 3/2001 | Pelc et al. |
| 6,205,999 B1 | 3/2001 | Ivri et al. |
| 6,218,193 B1 | 4/2001 | Kraft et al. |
| 6,220,075 B1 | 4/2001 | Papen et al. |
| 6,225,061 B1 | 5/2001 | Becker et al. |
| 6,232,129 B1 * | 5/2001 | Wiktor ............... 436/180 |
| 6,296,811 B1 * | 10/2001 | Sasaki ............... 422/509 |
| 6,377,387 B1 | 4/2002 | Duthaler et al. |
| 6,387,330 B1 | 5/2002 | Bova et al. |
| 6,427,682 B1 | 8/2002 | Klimowicz et al. |
| 6,453,929 B1 | 9/2002 | Johnson et al. |
| 6,467,476 B1 | 10/2002 | Ivri et al. |
| 6,485,690 B1 | 11/2002 | Pfost et al. |
| 6,521,187 B1 | 2/2003 | Papen |
| 6,537,505 B1 | 3/2003 | LaBudde et al. |
| 6,540,153 B1 | 4/2003 | Ivri |
| 6,540,154 B1 | 4/2003 | Ivri et al. |
| 6,548,263 B1 | 4/2003 | Kapur et al. |
| 6,551,557 B1 | 4/2003 | Rose et al. |
| 6,554,201 B2 | 4/2003 | Klimowicz et al. |
| 6,569,687 B2 | 5/2003 | Doktycz et al. |
| 6,576,295 B2 | 6/2003 | Tisone |
| 6,585,296 B1 | 7/2003 | Picha et al. |
| 6,589,791 B1 | 7/2003 | LaBudde et al. |
| 6,592,825 B2 * | 7/2003 | Pelc et al. ............... 422/521 |
| 6,599,479 B1 | 7/2003 | Kietzmann et al. |
| 6,599,755 B1 | 7/2003 | Eipel et al. |
| 6,627,157 B1 | 9/2003 | Doktycz et al. |
| RE38,281 E | 10/2003 | Tisone |
| 6,629,646 B1 | 10/2003 | Ivri |
| 6,640,804 B2 | 11/2003 | Ivri et al. |
| 6,669,909 B2 | 12/2003 | Shvets et al. |
| 6,710,335 B2 | 3/2004 | Ellson et al. |
| 6,713,021 B1 | 3/2004 | Shvets et al. |
| 6,752,490 B2 | 6/2004 | Pickrell |
| 6,797,945 B2 | 9/2004 | Berggren et al. |
| 6,805,303 B2 | 10/2004 | Hess et al. |
| 6,816,742 B2 | 11/2004 | Kim et al. |
| 6,838,051 B2 | 1/2005 | Marquiss et al. |
| 6,852,291 B1 | 2/2005 | Johnson et al. |
| 6,852,851 B1 | 2/2005 | Tooke et al. |
| 6,874,699 B2 | 4/2005 | Larson et al. |

(56) References Cited

U.S. PATENT DOCUMENTS

| | | |
|---|---|---|
| 6,890,485 B1 | 5/2005 | Stylli et al. |
| 6,995,024 B2 | 2/2006 | Smith et al. |
| 7,105,357 B1 * | 9/2006 | Kalkum et al. .............. 436/180 |
| 7,125,519 B1 | 10/2006 | Szita et al. |
| 7,141,368 B2 | 11/2006 | Fisher et al. |
| 7,160,511 B2 | 1/2007 | Takahashi et al. |
| 7,179,423 B2 | 2/2007 | Bohm et al. |
| 7,199,809 B1 | 4/2007 | Lacy et al. |
| 7,211,223 B2 | 5/2007 | Fouillet et al. |
| 7,244,396 B2 | 7/2007 | Chait et al. |
| 7,258,253 B2 | 8/2007 | Nicol et al. |
| 7,312,068 B2 | 12/2007 | Pinkel et al. |
| 7,332,347 B2 | 2/2008 | Li et al. |
| 7,416,706 B2 * | 8/2008 | Brunner et al. .............. 422/106 |
| 7,429,359 B2 | 9/2008 | Reichel et al. |
| 7,438,858 B2 | 10/2008 | Shvets et al. |
| 7,470,547 B2 | 12/2008 | Tisone et al. |
| 7,615,378 B2 | 11/2009 | Dual et al. |
| 7,754,439 B2 | 7/2010 | Moore et al. |
| 8,196,573 B2 | 6/2012 | Fink et al. |
| 8,233,146 B2 | 7/2012 | Chen |
| 8,235,934 B2 * | 8/2012 | Tsuchiya et al. .............. 604/22 |
| 8,273,307 B2 * | 9/2012 | Eickhoff et al. .............. 422/501 |
| 8,287,806 B2 * | 10/2012 | Bjornson et al. .............. 422/63 |
| 8,323,882 B2 | 12/2012 | Moore et al. |
| 8,544,342 B1 * | 10/2013 | Feller .............. 73/861.24 |
| 8,808,625 B2 | 8/2014 | Aoki et al. |
| 2001/0014477 A1 | 8/2001 | Pelc et al. |
| 2001/0016177 A1 | 8/2001 | Pelc et al. |
| 2001/0036424 A1 | 11/2001 | Takahashi et al. |
| 2001/0053337 A1 | 12/2001 | Doktycz et al. |
| 2001/0055814 A1 * | 12/2001 | Sasaki .............. 436/180 |
| 2002/0001675 A1 | 1/2002 | Tisone |
| 2002/0011247 A1 | 1/2002 | Ivri et al. |
| 2002/0023639 A1 | 2/2002 | Ivri et al. |
| 2002/0064482 A1 | 5/2002 | Tisone et al. |
| 2002/0092366 A1 | 7/2002 | Brock et al. |
| 2002/0104530 A1 | 8/2002 | Ivri et al. |
| 2002/0136668 A1 * | 9/2002 | Wallace et al. .............. 422/100 |
| 2002/0150511 A1 | 10/2002 | Wiktor |
| 2002/0151085 A1 | 10/2002 | Zaffaroni et al. |
| 2002/0158027 A1 | 10/2002 | Moon et al. |
| 2002/0159919 A1 | 10/2002 | Churchill |
| 2002/0168297 A1 | 11/2002 | Shvets et al. |
| 2002/0185125 A1 | 12/2002 | Klimowicz et al. |
| 2003/0000520 A1 | 1/2003 | Ivri et al. |
| 2003/0019493 A1 | 1/2003 | Narayan et al. |
| 2003/0047620 A1 | 3/2003 | Litherland et al. |
| 2003/0143756 A1 | 7/2003 | Fisher et al. |
| 2003/0148538 A1 | 8/2003 | Ng |
| 2003/0167822 A1 | 9/2003 | Johnson et al. |
| 2003/0170903 A1 | 9/2003 | Johnson et al. |
| 2003/0172743 A1 * | 9/2003 | Ao et al. .............. 73/861.27 |
| 2003/0175163 A1 | 9/2003 | Shvets et al. |
| 2003/0207464 A1 | 11/2003 | Lemmo et al. |
| 2003/0211620 A1 | 11/2003 | LaBudde |
| 2003/0215957 A1 | 11/2003 | Lemmo et al. |
| 2003/0226906 A1 | 12/2003 | Ivri |
| 2003/0228241 A1 | 12/2003 | Legge |
| 2004/0000598 A1 | 1/2004 | Ivri |
| 2004/0004133 A1 | 1/2004 | Ivri et al. |
| 2004/0009611 A1 | 1/2004 | Williams et al. |
| 2004/0072364 A1 | 4/2004 | Tisone |
| 2004/0072365 A1 | 4/2004 | Rose |
| 2004/0089825 A1 | 5/2004 | Schwenke et al. |
| 2004/0091398 A1 | 5/2004 | Gilbert et al. |
| 2004/0101445 A1 | 5/2004 | Shvets et al. |
| 2004/0139963 A1 | 7/2004 | Ivri et al. |
| 2004/0219688 A1 | 11/2004 | Churchill et al. |
| 2004/0265185 A1 | 12/2004 | Kitagawa |
| 2005/0003458 A1 | 1/2005 | Moore et al. |
| 2005/0032242 A1 | 2/2005 | Sasaki |
| 2005/0217666 A1 | 10/2005 | Fink et al. |
| 2005/0229926 A1 | 10/2005 | Fink et al. |
| 2005/0229927 A1 | 10/2005 | Fink et al. |
| 2005/0229928 A1 | 10/2005 | Ivri et al. |
| 2005/0229929 A1 | 10/2005 | Ivri |
| 2005/0232823 A1 | 10/2005 | Brock et al. |
| 2005/0263608 A1 | 12/2005 | Ivri |
| 2005/0279851 A1 | 12/2005 | Ivri |
| 2006/0093525 A1 * | 5/2006 | Brunner et al. .............. 422/100 |
| 2006/0147313 A1 | 7/2006 | Zengerle et al. |
| 2006/0211132 A1 | 9/2006 | Miledi et al. |
| 2006/0255174 A1 | 11/2006 | Ivri et al. |
| 2006/0263264 A1 | 11/2006 | Bohm et al. |
| 2006/0281213 A1 | 12/2006 | Szita et al. |
| 2006/0286678 A1 | 12/2006 | Dual et al. |
| 2007/0044792 A1 | 3/2007 | Ivri |
| 2007/0075161 A1 | 4/2007 | Ivri |
| 2007/0113618 A1 * | 5/2007 | Yokoi et al. .............. 73/35.01 |
| 2007/0209659 A1 | 9/2007 | Ivri et al. |
| 2007/0267010 A1 | 11/2007 | Fink et al. |
| 2008/0017198 A1 | 1/2008 | Ivri |
| 2008/0142002 A1 | 6/2008 | Fink et al. |
| 2008/0142624 A1 | 6/2008 | Ivri et al. |
| 2008/0184784 A1 * | 8/2008 | Dam .............. 73/61.75 |
| 2008/0226498 A1 | 9/2008 | Stylli et al. |
| 2008/0227663 A1 | 9/2008 | Tisone et al. |
| 2009/0060793 A1 | 3/2009 | Eickhoff et al. |
| 2009/0108094 A1 | 4/2009 | Ivri |
| 2009/0134235 A1 | 5/2009 | Ivri |
| 2009/0261178 A1 | 10/2009 | Ivri et al. |
| 2010/0015009 A1 | 1/2010 | Wallace et al. |
| 2010/0102093 A1 | 4/2010 | Ham et al. |
| 2011/0168170 A1 | 7/2011 | Patton et al. |
| 2011/0168172 A1 | 7/2011 | Patton et al. |
| 2011/0208161 A1 | 8/2011 | Ivri |
| 2011/0311409 A1 * | 12/2011 | Silverbrook et al. .............. 422/509 |
| 2012/0012665 A1 | 1/2012 | Ivri |
| 2012/0128360 A1 * | 5/2012 | Lee et al. .............. 398/72 |
| 2012/0312836 A1 * | 12/2012 | Eickhoff et al. .............. 222/1 |

FOREIGN PATENT DOCUMENTS

| | | |
|---|---|---|
| DE | 20 2006 019 795 U1 | 4/2007 |
| EP | 0 810 438 A2 | 12/1997 |
| EP | 0 810 438 A3 | 9/1998 |
| EP | 0 990 528 A2 | 4/2000 |
| EP | 0 990 528 A3 | 6/2000 |
| EP | 1 099 484 A1 | 5/2001 |
| EP | 1 128 310 A2 | 8/2001 |
| EP | 1 128 310 A3 | 8/2001 |
| EP | 1 179 364 A2 | 2/2002 |
| EP | 1 179 368 A2 | 2/2002 |
| EP | 1 179 368 A3 | 10/2002 |
| EP | 1 179 364 A3 | 2/2003 |
| EP | 1 396 714 A1 | 3/2004 |
| EP | 1 379 332 B1 | 11/2005 |
| EP | 1 485 204 B1 | 2/2006 |
| EP | 1 658 894 A1 | 5/2006 |
| EP | 1 103 305 A1 | 5/2011 |
| WO | WO 93/01404 A1 | 1/1993 |
| WO | WO 96/31289 A1 | 10/1996 |
| WO | WO 97/07896 A1 | 3/1997 |
| WO | WO 97/44134 A1 | 11/1997 |
| WO | WO 99/30168 A1 | 6/1999 |
| WO | WO 99/42752 A1 | 8/1999 |
| WO | WO 99/42804 A2 | 8/1999 |
| WO | WO 99/63946 A2 | 12/1999 |
| WO | WO 01/51110 A1 | 7/2001 |
| WO | WO 02/36181 A2 | 5/2002 |
| WO | WO 02/074443 A2 | 9/2002 |
| WO | WO 02/076615 A2 | 10/2002 |
| WO | WO 03/072258 A1 | 9/2003 |
| WO | WO 2005/102431 A2 | 11/2005 |
| WO | WO 2006/102345 A2 | 9/2006 |
| WO | WO 2006/127181 A2 | 11/2006 |
| WO | WO 2008/005030 A1 | 1/2008 |
| WO | WO 2008/076606 A2 | 6/2008 |
| WO | WO 2009/055459 A1 | 4/2009 |
| WO | WO 2011/019954 A2 | 2/2011 |
| WO | WO 2011/088070 A1 | 7/2011 |

(56) References Cited

FOREIGN PATENT DOCUMENTS

| WO | WO 2011/088071 A1 | 7/2011 |
| WO | WO 2012/100205 A2 | 7/2012 |

OTHER PUBLICATIONS

High Precision Non-Contact Dispensing, Innovadyne Technologies, Inc., printed from the internet on Jan. 17, 2008, 5 pp.

Innovadyne Patents—Dispensing Instruments, Innovadyne Technologies, Inc., printed from the internet on Jan. 17, 2008, 4 pp.

International Search Report and Written Opinion in related PCT International Application No. PCT/US2012/02209, dated Oct. 26, 2012, in 11 pages.

International Preliminary Report on Patentability in related International PCT Application No. PCT/US2012/022091, dated Jul. 23, 2013, 7 pages.

The sciFLEXARRAYER Piezo Dispenser, Scienion AG, printed from the internet on Jan. 9, 2007, www.scienion.de, 2 pp.

Scienion Press Release of Nov. 24, 2004, printed from the internet on Jan. 9, 2007, www.scienion.de, 1 p.

The sciFLEXARRAYER Piezo Dispenser, Scienion AG, sciFLEXARRAYER S5 / S11, printed from the internet on Jan. 15, 2008, www.scienion.de, 2 pp.

sciFLEXARRAYER Piezo Dispensers, Scienion AG, The sciFLEXARRAYER S3, printed from the internet on Jan. 15, 2008, www.scienion.de, 2 pp.

sciFLEXARRAYER—ultra-low volume dispensing systems for R&D and manufacturing, printed from the internet on Jan. 15, 2008, www.scienion.de, 2 pp.

sciFLEXARRAYER S100—a top level high throughput production device, printed from the internet on Jan. 15, 2008, www.scienion.de, 2 pp.

Product Guide, TaqMan Gene Expression Assay Products, Applied Biosystems, Sep. 2005, 14 pp.

TaqMan Gene Expression Assays, Applied Biosystems, Dec. 2006, 24 pp.

Sigma-Aldrich, Technical Bulletin AL-266; Preparing Self-Assembled Monolayers (SAMs)—A Step-by-Step Guide for Solution Based Self Assembly, downloaded from the Internet on Aug. 8, 2013, 3 pages.

\* cited by examiner

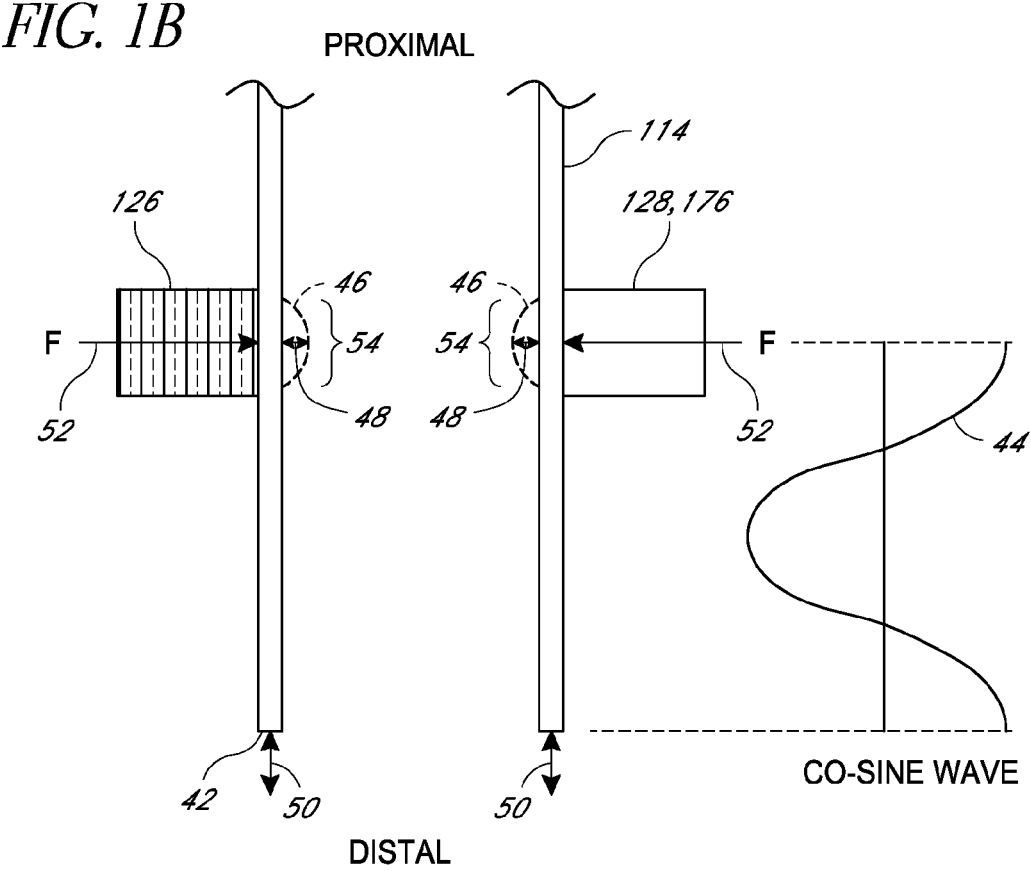
FIG. 1B
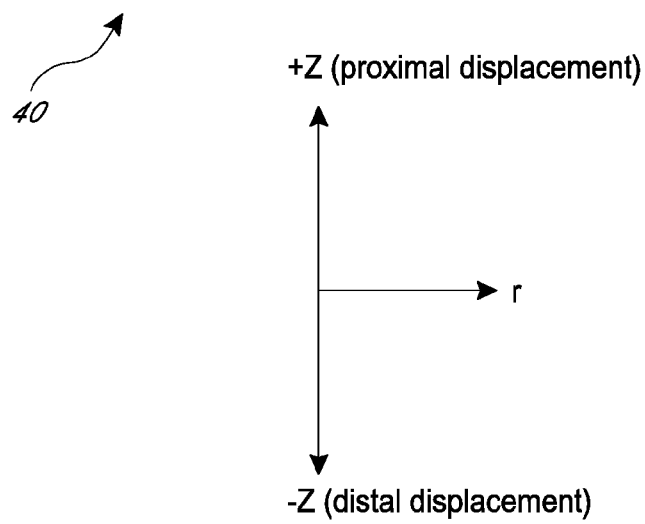

PIEZOELECTRIC DISPENSER WITH A LONGITUDINAL TRANSDUCER AND REPLACEABLE CAPILLARY TUBE

CROSS-REFERENCE TO RELATED APPLICATIONS

This patent application claims the benefit of U.S. Provisional Patent Application No. 61/632,842, filed Nov. 11, 2011, entitled PIEZOELECTRIC DISPENSER WITH A LONGITUDINAL TRANSDUCER AND REPLACEABLE CAPILLARY TUBE, and the benefit of U.S. Provisional Patent Application Ser. No. 61/461,664; filed Jan. 21, 2011, entitled PIEZOELECTRIC DISPENSER, the entirety of each one of which is hereby incorporated by reference herein.

BACKGROUND OF THE INVENTION

1. Field of the Invention

The invention relates in general to systems and methods for acquiring and dispensing predetermined volumes of liquids and, more particularly but not exclusively, to piezoelectric devices and methods for dispensing and transferring small volumes of fluid in the form of single droplets or drops, typically ranging in volume from picoliters to nanoliters.

2. Description of the Related Art

Conventional piezoelectric dispensing devices have a tube that is typically entirely surrounded by and bonded to a piezoelectric actuator to produce droplets. Activation of the piezoelectric actuator transmits acoustic pressure into and through the liquid in the tube. The acoustic pressure propagates through the liquid and to a dispensing opening of the tube. This results in ejection of a liquid drop from the device.

Such conventional devices have several disadvantages. One is that their operation is highly dependent on the characteristics and properties of the particular liquid to be dispensed. Thus, disadvantageously, dispensing parameters such as droplet size cannot be independently controlled and various compensative measures have to be taken which can increase cost and reduce efficiency.

Moreover, to transmit pressure to the liquid in the tube to dispense a droplet a relatively force (energy) needs to be imparted by the piezoelectric actuator. This can not only raise system and operational costs, but can undesirably lead to degradation, damage and denaturing of the liquid. Also, this further limits the actuator's operational frequency since higher frequencies may also cause liquid degradation, damage or denaturing. The transmission of a relatively high pressure to the liquid can lead to the formation of bubbles in the liquid which can undesirably cause dispensing inaccuracies, among other undesired operational complications.

Another disadvantage of such conventional devices is that the piezoelectric actuator is structurally bonded to the tube. Since many applications of dispensing using such devices involve the use of multiple liquids, such as, but not limited to, the fields of genomics and proteomics, among others, these devices fail to provide an efficient and cost-effective approach to a system involving handling of multiple liquids in small quantities, for example, biological and chemical reagents.

Typically, there are two options, neither one desirable, of addressing this situation. One is to simply discard the piezoelectric-tube device and use a new one for further processing of other liquids. The piezoelectric actuator is a relatively expensive component, and discarding it after a single use disadvantageously adds to the cost—given that some of the applications can involve the handling of hundreds or thousands, if not more, different liquids.

The second option is to rinse and clean the dispensing tube after each use to prevent contamination. Firstly, this undesirably adds additional steps to the liquid handling in terms of both efficiency and cost of the overall process. Secondly, in spite of any stringent rinsing or cleaning routines the risk of cross contamination always exists.

SUMMARY OF THE INVENTION

It is one advantage of certain embodiments of the invention to provide systems, devices and methods comprising a piezoelectric dispenser or dispensing device that is configured so that the dispensing tube and piezoelectric actuator are separable. This allows for the removal and replacement of the tube for subsequent use. Desirably, such embodiments with a separable tube, not only eliminate the need for cleaning and the risk of contamination from left over material transferred from prior use, but also advantageously increase system efficiency and are cost-effective.

Certain embodiments of the invention provide longitudinal transducers or transmission devices, and related methods of operation, for transmission or conversion of radial motion to axial or longitudinal motion. The longitudinal transducer generally comprises a piezoelectric actuator coupled to a tube or the like. Actuation of the piezoelectric actuator by a voltage pulse causes radially inwards motion of the tube and generates an acoustic pressure or stress wave through the wall of the tube which results in axial or longitudinal motion, or displacement of the tube wall at the distal tip of the tube. In other words, actuation of the actuator causes the distal tip to axially extend and then axially retract back to its original form on deactivation of the actuator and/or its pulse, that is, the distal tip oscillates. When multiple pulses are provided, the distal tip oscillates in response to each pulse cycle.

Certain embodiments of the invention provide systems, devices and methods comprising a liquid dispenser or dispensing device that includes and/or incorporates a longitudinal transducer with a piezoelectric actuator, as disclosed herein, for transmission or conversion of radial motion to axial or longitudinal motion to a dispensing tube thereby causing a droplet to be dispensed from an aperture or outlet orifice at the distal tip of the tube. Some of these embodiments are configured so that the dispensing tube and piezoelectric actuator are separable, as disclosed herein.

Some advantages of the dispensing embodiments utilizing a longitudinal transducer include, but are not limited to: since minimal or negligible force, pressure is imparted to the liquid in the dispensing tube several of the problems associated with conventional dispensing devices, as described above, are mitigated or substantially eliminated—such as greater dispensing flexibility and independence substantially regardless of the liquid properties or characteristics, general avoidance of problems associated with degradation, damage and denaturing of the liquid and undesirable bubble formation, and ability to operate at higher frequencies, among others.

One exemplary application of the dispensers or dispensing devices disclosed herein relates to the production of DNA arrays for genetic engineering uses, wherein a high clone density is achieved by means of a small droplet size, for which piezoelectric operated dispensers in accordance with embodiments of the invention are particularly suitable. Embodiments of the invention can be particularly advantageous for production of working copies for screening processes, for example, in the pharmaceutical industry in production of microarrays or for the production of multiply assays.

Some embodiments provide a piezoelectric micro-dispensing device, apparatus or system that enables automatic or manual transfer of small volumes of liquids typically ranging in volume from picoliters to nanoliters. Advantageously, the device can allow for the disposal of the dispensing tube while permitting reuse of the piezoelectric actuator. Alternatively, or in addition, the device can desirably further comprise a longitudinal transducer for transmission or conversion of radial motion to axial or longitudinal motion to a dispensing tube thereby allowing for a liquid droplet to be dispensed from an aperture at the distal tip of the tube.

In some embodiments, the dispenser includes a main body portion or mounting bracket and comprises a tube which includes a dispensing nozzle at one end of the tube. The tube can comprise, for example, but not limited to, a glass capillary tube. The dispenser can further comprise a piezoelectric clamp for clamping to an outer circumferential or peripheral surface of the tube. The piezoelectric clamp can comprise two opposing jaws or clamping or supporting structures. The first jaw can include a piezoelectric actuator or transducer and the second jaw can include a preloading, clamping, retaining or biasing mechanism, device, assembly or structure to apply a predetermined reactive force to the tube.

In some embodiments, the preloading mechanism, device, assembly or structure includes a preloading screw. In other embodiments, the preloading mechanism, device, assembly or structure includes a preloading assembly of a spring, such as a leaf spring or the like, a mass providing ball or the like, and a knob or lever that is utilized to actuate or release the preloading.

In some embodiments, the clamp is operable to hold the tube in place and to transmit acoustic pressure to the clamped area of the tube on actuation of the piezoelectric actuator or transducer. Acoustic pressure or stress propagates longitudinally from the clamped area through the tube and toward the nozzle whereat axial displacement at the distal tip of the tube and/or transmission of acoustic pressure to the fluid in the area of the nozzle propels, ejects or dispenses a droplet of fluid having a predetermined volume or quantity, due at least in part to the solid-fluid interaction in the area of the nozzle. Thus, a wave passing longitudinally through the tube wall provides for transmission or conversion of tube radial motion to axial or longitudinal motion to the tube tip thereby allowing for a liquid droplet to be dispensed from an aperture at the tip of the tube. In some embodiments, this wave has a generally sinusoidal or cosine waveform, profile or configuration.

In some embodiments, following each use of dispensing a particular liquid the clamp may be released to replace the tube. As such, the tube may be disposed following each use with a particular liquid while the piezoelectric clamp is reused with another tube. Advantageously, this provides an economic utilization of the piezoelectric or piezoceramic actuator or transducer. In addition, and desirably, such an arrangement of a dispenser eliminates the need for cleaning the tube and the risk of cross contamination from left over material transferred from the prior use of the device.

Single droplets having a volume in the range from a few picoliters to a few nanoliters can be accurately and reliably dispensed, for example, in the range from about 50 picoliters to about 1,000 picoliters (1 nanoliter), including all values and sub-ranges therebetween.

In addition to dispensing droplets, fluid may also be acquired or aspirated into the tube. The fluid samples can be acquired, aspirated or drawn up into the tube by dipping its tip into a fluid source and applying vacuum, for example, using a pump or the like. The size of the tube can vary, as needed or desired, but is typically sufficiently small to draw fluid from a standard microtiter or micro-well plate, for example, one having a square or diametric dimension of about 5 mm or less.

The piezoelectric actuator, in some embodiments, comprises a monolithic co-fired ceramic stack which expands and contracts under the input of an alternating voltage. The stack can be a linear or longitudinal stack which expands and contracts generally linearly or longitudinally in the direction of the stack. The piezoelectric or piezoceramic stack is capable of applying a predetermined force in the radial direction against the tube. To prevent breakage of the tube, the tube may be provided with a sleeve, for example, a plastic or metal sleeve, which substantially evenly distributes the force around the clamping area of the tube.

Some embodiments are directed to systems, devices, methods, and techniques are provided, for acquiring and dispensing predetermined volumes of liquids and, in particular, to a unique piezoelectric dispensing device for acquiring and dispensing of volumes of liquids, specifically, but not exclusively, for use in dispensing and transferring of small volumes of fluid in, for example, automatic or manual production of DNA arrays and assays, wherein droplets are dispensed in a single drop format with volumes, for example, ranging from about a few picoliters to several nanoliters. The dispensing devices or dispensers can advantageously utilize a disposable capillary tube assembly while desirably retaining the piezoelectric actuator or transducer for subsequent further uses, thereby mitigating the possibility of cross contamination of fluids and providing an economical and cost effective approach with reuse of the piezoelectric actuator or transducer for further operation such as with a variety of liquids to be dispensed and transferred. The systems or devices can incorporate a unique longitudinal transducer that transmits or converts radial tube displacement or motion to controlled axial or longitudinal displacement motion of a distal tip of the tube.

In some embodiments of the piezoelectric dispenser disclosed herein, the piezoelectric device does not completely surround, encircle or circumscribe the outer periphery of the dispensing tube, but does so only partially. In other words, the piezoelectric device is on a first side of the tube while the preloading device, when included, is on a second substantially opposed second side of the tube. In other embodiments, such as those not incorporating a configuration in which the dispensing tube is separable from the piezoelectric device, the piezoelectric device can substantially completely surround, encircle or circumscribe the outer periphery of the dispensing tube, or it can do so only partially.

In accordance with some embodiments, a dispenser for transferring a predetermined quantity of a liquid is provided. The dispenser generally comprises a tube, a piezoelectric device and a preloading device. The tube contains a liquid to be dispensed into or onto one or more targets. The piezoelectric device is selectively communicable with a first side of the tube and is responsive to an applied signal, and the preloading device is selectively communicable with a second side of the tube that is generally disposed in opposition to the first side, thereby allowing for separation of the tube and the piezoelectric device In some embodiments, the piezoelectric device is configured such that when actuated the piezoelectric device transmits a generally radial first force to the tube. Actuation of the piezoelectric actuator by a voltage pulse causes radially inwards motion of the tube and generates an acoustic pressure or stress wave through the wall of the tube which results in axial or longitudinal motion or displacement of the tube wall at the distal tip of the tube thereby causing a droplet of predetermined volume to be ejected from the tube. The preloading device, when included, can be configured to provide a generally reactive and opposed second force to the tube.

In accordance with some embodiments, a method of transferring a predetermined quantity of a liquid is provided. The method generally comprises providing a tube with a liquid to be dispensed and a piezoelectric device in communication with the tube. The piezoelectric device is actuated such that a generally radial force is applied to the tube and which creates a longitudinal stress or pressure wave that propagates to and causes axial displacement of a distal tip of the tube so as to eject a predetermined volume of the liquid. Advantageously, in some embodiments, the dispensing tube can be replaced with another tube for dispensing of another liquid.

In some embodiments, the dispensing systems, devices and methods disclosed herein may be used for the delivery of surfactants to neonate/local anesthetic in laparoscopy. In some embodiments, the dispensing systems, devices and methods disclosed herein may be used for the delivery of aerosolized pharmaceuticals to human or animal subjects. In some embodiments, the dispensing systems, devices and methods disclosed herein may be used for dispensing of chemicals for microelectronic manufacturing. In some embodiments, the dispensing systems, devices and methods disclosed herein may be used for printing inert inks onto surfaces, papers or the like, among others.

In accordance with some embodiments, a longitudinal transducer for converting a radial displacement to an axial displacement is provided. The longitudinal transducer generally comprises a tube, a linear or longitudinal piezoelectric actuator and an energy source. The tube has a length, a wall with a predetermined thickness, a lumen with a predetermined size or diameter, and a tip at a distal end of the tube. The linear or longitudinal piezoelectric actuator is clamped to the tube at a location proximal of the tip. The energy source is configured to provide at least one voltage pulse to the piezoelectric actuator. Actuation of the piezoelectric actuator causes a pressure wave to propagate from the proximal location of the tube toward the tip of the tube such that radial motion at the proximal location of the tube is transmitted as distally extending axial motion of the tip of the tube.

In one embodiment, the voltage pulse and configuration of the tube are selected such that a peak of the pressure wave is located substantially at the tip of the tube.

In accordance with some embodiments, a method of converting a radial displacement into an axial displacement is provided. The method involves providing a transducer that comprises a piezoelectric actuator which is responsive to a voltage signal. The piezoelectric actuator is actuated to provide a generally radial force to a tube of the transducer at a region that is proximal to a distal end of the tube. Radial motion of the tube at the proximal region of the tube is converted to generally axial motion at the distal end of the tube.

In one embodiment, actuation of the piezoelectric actuator comprises providing at least one voltage pulse to the piezoelectric actuator.

In one embodiment, the piezoelectric actuator comprises a linear or longitudinal piezoelectric actuator that is clamped to the tube.

In one embodiment, the axial motion comprises distal axial motion, and on deactivation of a pulse of the voltage signal the distal end of the tube is subjected to a motion in a proximal axial direction, thereby providing an axial oscillation in response to at least one pulsed voltage cycle.

In accordance with some embodiments, a dispenser for transferring a predetermined quantity of a liquid is provided. The dispenser generally comprises a tube a piezoelectric actuator. The tube contains a liquid to be dispensed into or onto one or more targets. The piezoelectric actuator is operatively coupled to the tube and is responsive to an applied signal for dispensing one or more droplets of the liquid. The tube and the piezoelectric actuator are separable such that the tube may be replaced while allowing for the same piezoelectric actuator to be used with another tube for dispensing another liquid.

In one embodiment, the piezoelectric actuator is mounted on a first side of the tube. In one embodiment, a preloading device is mounted on a second side of the tube which is generally opposed to the first side. In one embodiment, the preloading device comprises a screw. In one embodiment, the preloading device comprises an actuable spring loaded device. In one embodiment, the preloading device is releasable to allow for removal and replacement of the tube.

In one embodiment, actuation of the piezoelectric actuator causes conversion of a radial motion of the tube into an axial motion at a tip of the tube to cause a droplet of predetermined volume to be ejected from the tip.

In one embodiment, the piezoelectric actuator is spaced from the tube by a sleeve attached to the tube.

In one embodiment, the tube is part of a replaceable assembly that comprises the tube and a sleeve that is bonded to the tube.

In one embodiment, the dispenser further comprises a first jaw and a second jaw respectively engaged with the piezoelectric actuator and a preloading device. In one embodiment, the jaws comprise structures that engage a sleeve that is attached to the tube at a predetermined number of locations.

In one embodiment, a lumen of the tube has a generally annular configuration.

In one embodiment, the liquid to be dispensed within the tube is axially below the location of the piezoelectric actuator.

In one embodiment, the tube has an aperture plate with a generally curved funnel or conical configuration.

In one embodiment, the tube is part of a library of stored tubes with respective fluids pre-filled therein to allow for dispensing of multiple liquids while utilizing the same piezoelectric actuator.

In one embodiment, the dispenser is provided in combination with a fluid source that allows acquisition of liquid to be dispensed by the dispenser from the source.

In one embodiment, the dispenser is provided in combination with an imaging system to visualize and analyze dispensed droplets.

In one embodiment, the dispenser is provided in combination with a library of stored fluid samples that are selectively loadable within the tube.

In one embodiment, the piezoelectric actuator comprises a linear or longitudinal piezoelectric actuator that is clamped to the tube.

In accordance with some embodiments, a method of transferring a predetermined quantity of a liquid is provided. The method involves providing a tube from which a liquid is to be dispensed and a linear or longitudinal piezoelectric actuator clamped to the tube. The piezoelectric actuator is actuated to eject a droplet of liquid from a distal tip of the tube. The tube is separated from the piezoelectric actuator and replaced with another tube for dispensing of another liquid while utilizing the same piezoelectric actuator.

In one embodiment, the tube is selected from a library of stored tubes with respective liquids pre-filled therein.

In one embodiment, the liquid to be dispensed is aspirated from a fluid source.

In one embodiment, a library of stored fluid samples that are selectively loadable within the tube is provided.

In one embodiment, a lumen of the tube has a generally annular configuration.

In one embodiment, actuation of the piezoelectric actuator causes conversion of a radial motion of the tube into an axial motion at a tip of the tube to cause a droplet of predetermined volume to be ejected from the tip.

In accordance with some embodiments, a dispenser for transferring a predetermined quantity of a liquid is provided. The dispenser generally comprises a longitudinal transducer, an aperture and a liquid. The longitudinal transducer generally comprises a tube and a piezoelectric actuator. The tube has a length, a wall with a predetermined thickness, a lumen with a predetermined size or diameter, and a tip at a distal end of the tube. The piezoelectric actuator is operatively coupled to the tube at a location proximal of the tip. The aperture is at the tip of the tube. The liquid is to be dispensed into or onto one or more targets and is loaded within the tube. Actuation of the piezoelectric actuator causes a pressure wave to propagate from the proximal location of the tube toward the tip of the tube such that radial motion at the proximal location of the tube is transmitted as distally extending axial motion of the tip of the tube, thereby causing a droplet of a predetermined volume to be ejected from the aperture.

In one embodiment, the piezoelectric actuator comprises a linear or longitudinal piezoelectric actuator that is clamped to the tube.

In one embodiment, the dispenser further comprises an energy source that is configured to provide at least one voltage pulse to the piezoelectric actuator In one embodiment, the tube and the piezoelectric actuator are separable.

In one embodiment, the tube is selected from a library of stored tubes with respective liquids pre-filled therein.

In one embodiment, a lumen of the tube has a generally annular configuration.

In one embodiment, the dispenser is provided in combination with a fluid source that allows acquisition of liquid to be dispensed by the dispenser from the source.

In one embodiment, the dispenser is provided in combination with a library of stored fluid samples that are selectively loadable within the tube.

In accordance with some embodiments, a method of transferring a predetermined quantity of a liquid is provided. The method involves providing a tube with a liquid to be dispensed. The tube comprises a distal end with a tip and an aperture therealt. A piezoelectric actuator is provided in communication with the tube at a location proximal to the tip of the tube. The piezoelectric actuator is actuated such that a pressure wave propagates from the proximal location of the tube toward the tip of the tube and radial motion at the proximal location of the tube is transmitted as axial motion of the tip of the tube, thereby causing a droplet of a predetermined volume to be ejected from the aperture.

In one embodiment, the piezoelectric actuator comprises a linear or longitudinal piezoelectric actuator that is clamped to the tube.

In one embodiment, the tube is replaced with another tube for dispensing of another liquid.

In one embodiment, the tube is selected from a library of stored tubes with respective liquids pre-filled therein.

In one embodiment, the liquid to be dispensed is acquired from a fluid source.

In one embodiment, a library of stored fluid samples that are selectively loadable within the tube is provided.

In one embodiment, a lumen of the tube has a generally annular configuration.

In one embodiment, the piezoelectric actuator is positioned axially above the liquid in the tube.

In accordance with some embodiments, a longitudinal transducer for converting a radial displacement to an axial displacement is provided. The longitudinal transducer generally comprises a tube, a linear or longitudinal piezoelectric actuator and an energy source. The tube comprises a generally rigid material and has a length, a wall with a predetermined thickness, a lumen with a predetermined size or diameter, and a tip at a distal end of the tube. The rigid material of the tube has a modulus of elasticity greater than about 10 GPa. The linear or longitudinal piezoelectric actuator is clamped to the tube at a location proximal of the tip of the tube. The energy source is configured to provide at least one voltage pulse to the piezoelectric actuator. Actuation of the piezoelectric actuator causes a pressure wave to propagate from the proximal location of the tube through the wall of the tube and toward the tip of the tube such that radial motion at the proximal location of the tube is transmitted as distally extending axial motion of the tip of the tube.

In one embodiment, the rigid material of the tube has a modulus of elasticity greater than about 50 GPa.

In one embodiment, an aperture is at the tip of the tube and a liquid to be dispensed into or onto one or more targets, by the actuation of the piezoelectric actuator, is contained in the tube. In one embodiment, the tube and the piezoelectric actuator are separable.

For purposes of summarizing the invention, certain aspects, advantages and novel features of the invention have been described herein above. Of course, it is to be understood that not necessarily all such advantages may be achieved in accordance with any particular embodiment of the invention. Thus, the invention may be embodied or carried out in a manner that achieves or optimizes one advantage or group of advantages as taught or suggested herein without necessarily achieving other advantages as may be taught or suggested herein.

All of these embodiments are intended to be within the scope of the invention herein disclosed. These and other embodiments of the invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

Having thus summarized the general nature of the invention and some of its features and advantages, certain preferred embodiments and modifications thereof will become apparent to those skilled in the art from the detailed description herein having reference to the figures that follow, of which:

FIG. 1B is a simplified schematic view of a longitudinal transducer for transmission or conversion of radial movement to axial movement illustrating features and advantages in accordance with certain embodiments of the invention.

DETAILED DESCRIPTION OF THE PREFERRED EMBODIMENTS

The preferred embodiments of the invention described herein relate generally to systems and methods for acquiring and non-contact dispensing of predetermined volumes of liquids and, in particular, to unique piezoelectric dispensing devices for acquiring and dispensing of volumes of liquids, specifically, but not exclusively, for use in dispensing and transferring small volumes of fluid in, for example, automatic production of DNA arrays or multiple assays, wherein droplets are dispensed in a single drop format with volumes, for example, ranging from about a few picoliters to several nanoliters. Embodiments of the dispensing devices advantageously utilize a disposable, removable or separable capillary tube assembly while desirably retaining the piezoelectric actuator or transducer for subsequent further uses, thereby mitigating the possibility of cross contamination of fluids and providing an economical and cost effective approach with reuse of the piezoelectric actuator or transducer for further operation such as with a variety of liquids to be dispensed and transferred.

While the description sets forth various embodiment specific details, it will be appreciated that the description is illustrative only and should not be construed in any way as limiting the invention. Furthermore, various applications of the invention, and modifications thereto, which may occur to those who are skilled in the art, are also encompassed by the general concepts described herein.

Figure 1A:
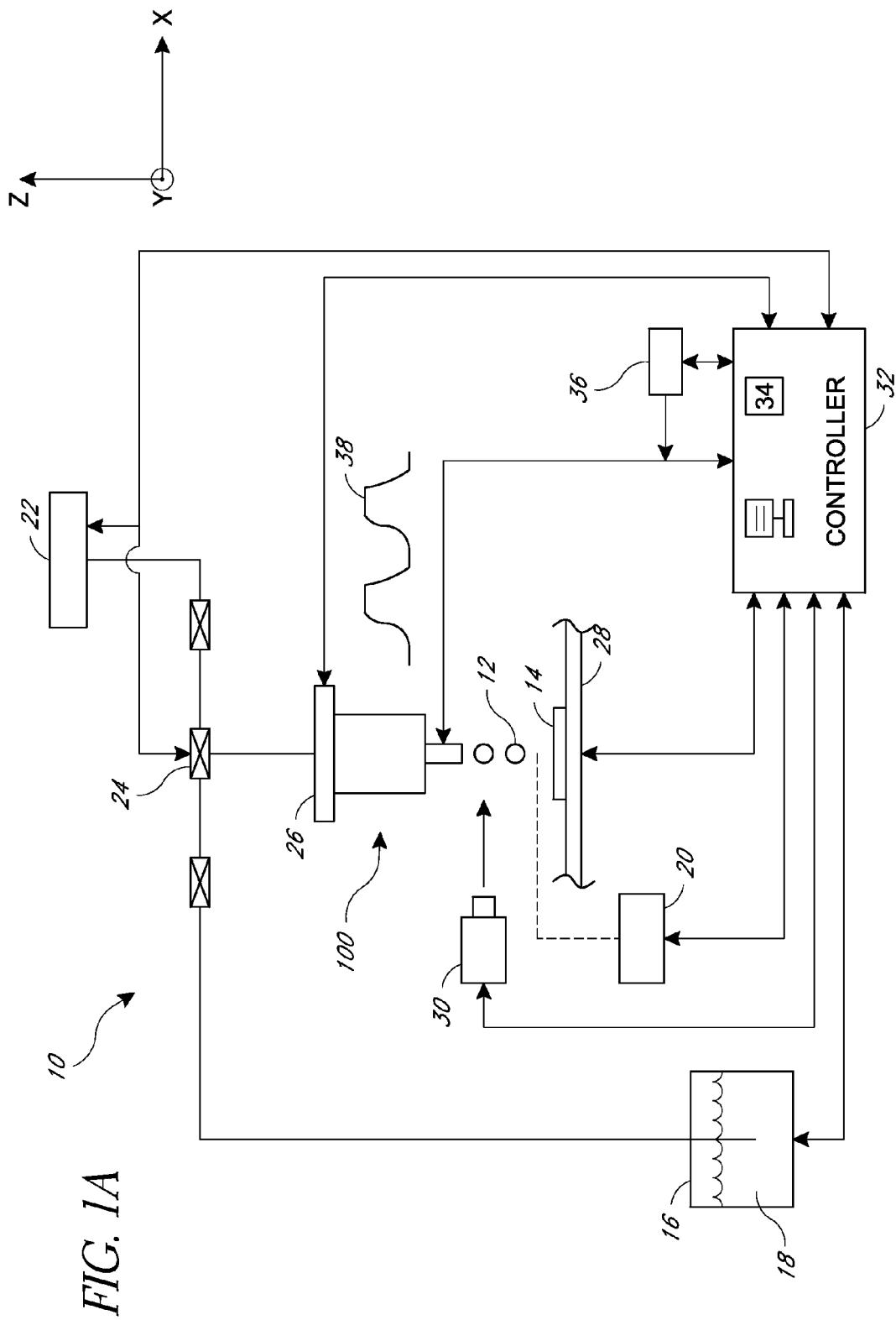
FIG. 1A is a simplified schematic view of a piezoelectric fluid dispensing system illustrating features and advantages in accordance with certain embodiments of the invention.

Turning now to the drawings, FIG. 1A illustrates a liquid dispensing (and aspirating or acquiring) system 10 for fluid handling and transfer in accordance with some embodiments. The system 10 generally comprises a piezoelectric dispensing device or dispenser 100 for dispensing single liquid droplets or drops 12 onto or into one or more targets or substrates 14 from a fluid or liquid source 16, such as a vessel or vial, among others, that holds or contains a liquid 18 to be dispensed The source 16 is in fluid communication with the dispensing device or dispenser 100 via, for example, a flexible tube or the like. The relative Z-direction positioning between the source 16 and the dispenser 100 (and its capillary tube) is selected giving consideration to a balance between the hydrostatic pressure head on the capillary tube, capillary forces and surface tension of the liquid 18 so that no liquid is emitted from the dispenser 100 unless actuated to do so. This balance also depends at least on the tube dimensions such as the size of the droplet emitting outlet orifice.

In some embodiments, the dispenser 100 is also utilized to aspirate or acquire liquid directly from a source 20 (e.g., vial, microtiter or micro-well plate and the like) by dipping the tip of the capillary tube into the liquid to be aspirated and applying a vacuum or suction to draw fluid into the tube. This can be done by using a vacuum source, pump 22 such as a positive displacement pump or the like. The system 10 can be arranged to accommodate both modes of acquiring the liquid to be dispensed (i.e., from the source 16 or the source 20), for example, by providing a two-way valve 24 or the like positioned as shown in FIG. 1A. Various other valves or the like may be provided in the system tubing to control fluid communication and flow, as needed or requires, with efficacy.

The liquids involved can include a wide variety wherein micro-volumes of fluid are to be handled, transferred and dispensed. These include, but not limited to, are liquids such as chemical and biological reagents, for example, DNA, cDNA, RNA, proteins, peptides, oligonucleotides, chromosomal formulations, and other organic or inorganic compounds, among others, or the like as known in the art.

The target or substrate 14 can comprise, for example, but not limited to, a microtiter or micro-well plate, glass slide, receptive membrane, test strip, vial or other suitable target, among others, or the like as known in the art.

Relative motion between the various components of the system 10 can be provided to accurately place, position and move them relative to one another. An X-, X-Y or X-Y-Z motion system 26 can be used to move the one or more dispensers 100 relative to the one or more targets or substrates 14, and/or the fluid or liquid sources 16 and 20 to provide the desired accuracy in dispensing and aspirating. For example, one or more suitable robot or robotic arms may be efficaciously used, as needed or desired, to provide the controlled relative motion The one or more targets or substrates 14 can be mounted on a carrier platform, table or carriage 28 to provide X-, X-Y or X-Y-Z motion. Robot or robotic arms may be utilized with efficacy, as required or desired. Similarly, relative motion of the fluid or liquid sources 16 and 20 can be controlled in a coordinated manner to allow for efficient liquid transfer. Web, reel or conveyor belt transport mechanisms can be efficaciously utilized to move any of the fluid targets or sources, as needed or desired.

In some embodiments, a droplet imaging system 30 is provided to analyze and visualize the dispensed droplet characteristics. These include, but are not limited to, the droplet volume, shape, sphericity, velocity, among others. This is not only useful during operation of the liquid handling system 10 but also initial system set-up for a particular application. For example, the imaging system 30 can be employed so that the various system operational parameters are fine tuned to the specific application. These parameters can then be adjusted to provide droplets having the required or desired properties.

The imaging system 30 can visualize and analyze droplets in flight. And, as such, cab adjust certain parameters, such as, but not limited to the, piezo-actuating voltage pulse profile, magnitude or frequency, and the like In one embodiment, the imaging system 30 comprises a high speed video instrument model JetExpert manufactured by ImageXpert Inc., Nashua, N.H., U.S.A. which is used to analyze and visualize droplet characteristics or properties such droplet size, droplet velocity, among others.

The liquid handling system further comprises a control system or controller 32 to monitor and control system operation. Suitable software 34 is utilized for users to control the various system parameters and operations. The controller 32 can include or be interfaced with various sub-controllers, such as, the piezoelectric dispenser 100, control and electronics circuitry or module 36, and those of the various motion, imaging and fluid flow and dynamic systems, among others, as needed or desired, with efficacy. The electronics module or energy source 36 provides a pulsed voltage signal 38 to actuate the piezoelectric dispenser 100.

It is preferable to fine tune the pulsed voltage signal 138 such that it is not strictly in a square or rectangular format to avoid sudden impact with the dispensing tube, but rather such that it is adapted to desirably comprise smooth signal transitions. This can advantageously result in improved droplet structure, droplet volume control and the like. The electronics module or energy source 36 can be configured with an arrangement of resistors, capacitors and the like to ensure creation of such a preferred voltage signal 138. The smooth transition can be more advantageous when relatively larger droplets are to be dispensed.

Though FIG. 1A shows only a single dispenser 100, in other embodiments, it is contemplated that multiple dispensers in linear (1×N) or two-dimensional (M×N) arrays are used. These may be provided and operated either in parallel or in another coordinated fashion, as desired. It should be understood that any discussion herein with specific reference to the single dispenser embodiment is substantially equally applicable, with possible modifications as apparent to the skilled artisan, to multiple dispensers actuated by one or more piezoelectric actuators or transducers. In addition, fluid may be provided to multiple dispensers using a manifold configuration, as needed or desired. Moreover, the system 10 can be configured to provide on-the-fly dispensing of liquid droplets 12 as deemed suitable. For example, as disclosed in U.S. Pat. No. 6,063,339, the entirety of which is hereby incorporated by reference herein.

FIG. 1B illustrates a longitudinal transducer or transmission 40 in accordance with some embodiments. The longitudinal transducer 40 generally comprises a piezoelectric actuator or device 126 operatively coupled to a tube 114. The linear or longitudinal piezoelectric actuator 126 can be clamped to the tube 114, as discussed further below and herein.

The longitudinal transducer 40 can further comprise a preloading, clamping, retaining or biasing screw, mechanism, device, assembly or structure 128, 176 that allows for the tube 114 and piezoelectric actuator 126 to be separated, as discussed further below and herein. Optionally, the piezoelectric actuator 126 can be fixedly attached (e.g., bonded) to the tube 114 and the preloading device may be replaced by a fixedly attached support structure or the like to provide a reactive force to the force generated by the piezoelectric actuator 126. The piezoelectric actuator 126 can be on a portion or side of the tube 114 with the preloading device 128, 176 or support structure being on a generally opposed portion or side of the tube 114. Optionally, the piezoelectric actuator 126 can substantially completely surround, encircle or circumscribe the outer periphery of the tube 114. A sleeve, pad or the like may be provided intermediate the piezoelectric actuator 126 and the tube 114. Similarly, a sleeve, pad or the like may be provided intermediate the preloading device 128, 176 (or support structure) and the tube 114.

In operation, a voltage pulse (or alternating voltage) actuates the piezoelectric actuator 126 so that it expands and a generally radial force 52 is exerted or applied on the wall of the tube 114 at generally region 54 of the tube. The region 54 is spaced by a predetermined distance from a distal tip 42 of the tube 114. This radial force 152 causes a small deformation 46 and radial motion, displacement or movement 48 of the tube 114. Further, acoustic pressure or stress propagates or is transmitted axially or longitudinally from the region or area 54 of the tube 114, through the wall of the tube 114 and toward the tube tip 42 which undergoes distal axial or longitudinal motion, displacement or movement 50 in a direction extending away from the piezoelectric actuator 126 (motion in a distal, or negative or −Z direction). Thus, a stress or pressure wave 44 passes longitudinally or axially through the tube wall and provides for transmission or conversion of tube radial motion 48 to axial or longitudinal motion 50 at the tube tip 42. In some embodiments, the wave 44 has a generally sinusoidal or cosine waveform, profile or configuration.

On completion of one cycle, the tube 114 reverts back to its deactivated state with radially outward tube motion 48 and proximally retracting tube tip axial motion 50 in a direction extending toward the piezoelectric actuator 126 (motion in a proximal, or in a positive or +Z direction). When multiple pulses of an alternating voltage cause expansion and contraction of the piezoelectric actuator 126 the tube tip 42 undergoes multiple axial or longitudinal oscillations 50.

It should be appreciated, that embodiments of the invention, contemplate and utilize the balance between the voltage pulse (or alternating voltage), the configurations, arrangements, sizes and/or dimensions of the piezoelectric actuator 126 and tube 114 to, in some embodiments, provide a stress or pressure profile and wave form that results in a controlled and/or predetermined axial displacement or oscillation at the distal tip 42 of the tube 114.

The longitudinal transducer 40 may be utilized with any of the embodiments of the dispensers disclosed or suggested herein. These dispensers would generally comprise the longitudinal transducer 40 in combination with a liquid to be dispensed in the tube 114 and possibly a suitable nozzle or aperture plate to define an aperture or outlet orifice at the tube's distal tip 42. Thus, in operation, the dispensers can provide for droplet dispensing (such as drop-on-demand dispensing) wherein the tube tip longitudinal or axial oscillation or motion creates a suitable solid-liquid dynamic interaction to facilitate ejection of single droplets of a predetermined size.

Embodiments of the longitudinal transducers and/or dispensers disclosed herein can be thought of as providing q unique ultrasonic horn wherein the transmission of longitudinal acoustic waves is utilized to transmit and/or convert radial tube motion to controlled and predetermined axial motion of the tube.

Figure 2:
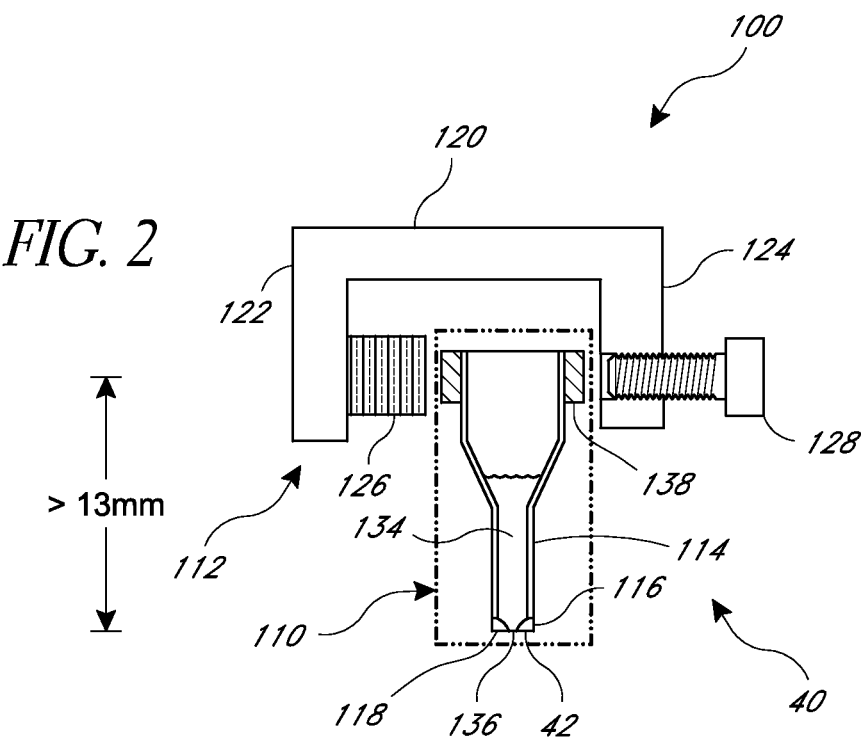
FIG. 2 is a simplified schematic side view of a piezoelectric fluid dispenser in an unclamped position illustrating features and advantages in accordance with certain embodiments of the invention.
Figure 3:
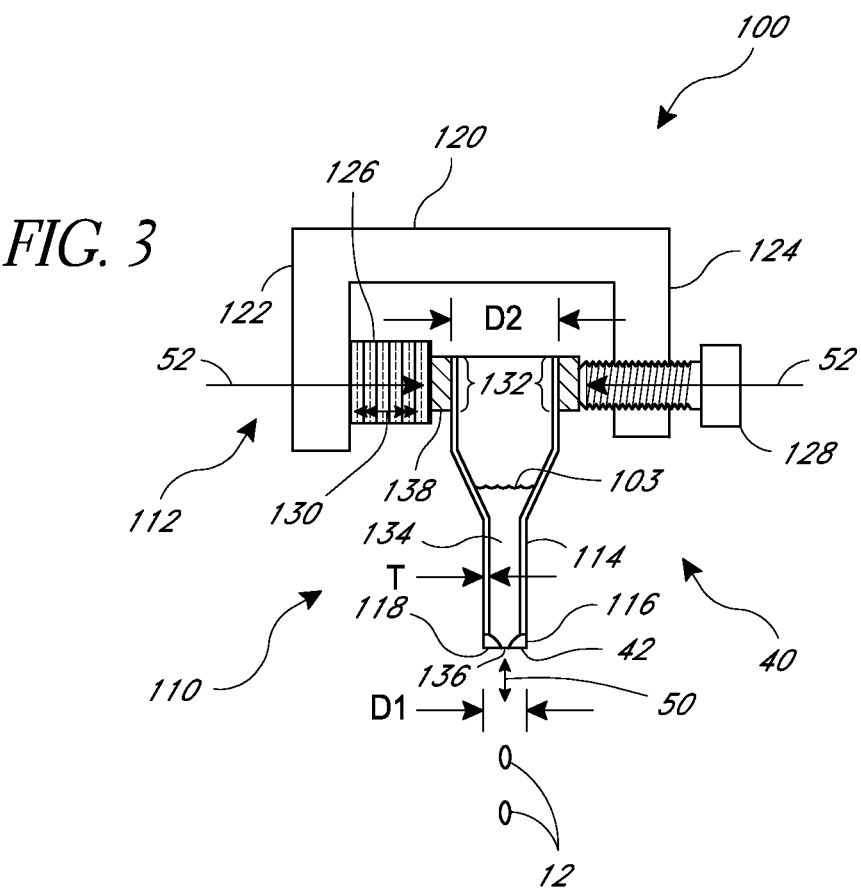
FIG. 3 is a simplified schematic side view of the piezoelectric fluid dispenser of FIG. 2 in a clamped position illustrating features and advantages in accordance with certain embodiments of the invention.
Figure 4:
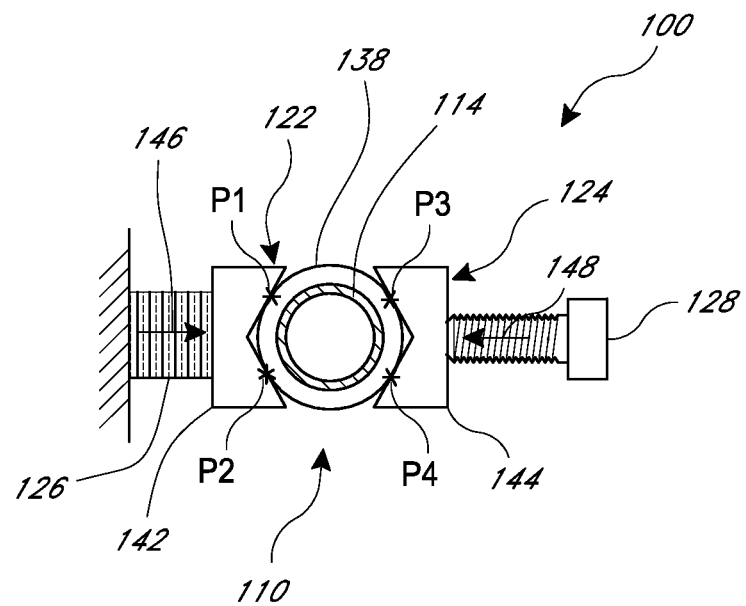
FIG. 4 is a simplified schematic top view of the piezoelectric fluid dispenser of FIG. 3 illustrating features and advantages in accordance with certain embodiments of the invention.

FIGS. 2 to 4 illustrate different views and/or arrangements of a piezoelectric dispensing device or dispenser 100 for fluid handling and transfer in accordance with some embodiments, with like reference numerals corresponding to like elements or structures. The dispenser 100 generally comprises, for illustrative purposes two assemblies, or sub-assemblies 110 and 112.

The first structure, arrangement, assembly or sub-assembly 110 (bounded by dashed lines, merely for illustrative purposes, in FIG. 2) comprises a capillary tube 114 and a dispensing nozzle 116 generally including an aperture or outlet orifice structure or plate 118. However, these are non-limiting descriptions such that the outlet 118 and nozzle 116 can be part of or incorporated into the tube 114 or assembly 110.

The second structure, arrangement, assembly or sub-assembly 112 can be viewed as, for example, but not limited to, a piezoelectric C-Clamp sub-assembly or the like that comprises a mount, support structure or bracket 120. The bracket 120 comprises a couple of opposed jaws or arms 122 and 124. A piezoelectric actuator, transducer, element, stack or assembly 126 is mounted on the first arm 122 and a preloading, clamping, retaining or biasing screw, mechanism, device, assembly or structure 128 is mounted on the second arm 124.

FIG. 3 illustrates the dispensing device or dispenser 100 in a preloaded or clamped position. The screw 128 is fastened and locks the capillary tube 114 in place by applying force in the radial direction of the tube 114 such that tube 114 is retained between the piezoelectric actuator, transducer or element 126 and the screw 128. (Further structural details of the preloading clamping jaws are discussed below with particular reference to FIG. 4, and show that in accordance with some embodiments respective opposing portions of respective jaws are positioned intermediate the piezoelectric element, the screw and the tube.)

The dispenser 100, in some embodiments, includes or incorporates the longitudinal transducer 40. This longitudinal transducer 140 can generally comprise the tube 114, piezoelectric actuator 126 and the clamping or preloading device 128. The piezoelectric actuator 126 can be a linear or longitudinal piezoelectric actuator 126 clamped to the tube 114.

Upon actuation of the piezoelectric actuator, transducer or element 126, such as by a voltage pulse or an alternating voltage, it expands and a pulse of force 52 is applied in a generally radial direction 130 toward the tube 114. The force 52 produces stress in the tube wall at the clamped preloaded region 132 of the tube 114. Stress or pressure in the region 132 produces an acoustic pressure or stress wave that propagates or is transmitted longitudinally through the wall of the tube 114 toward the nozzle aperture plate 118 and distal tip 42. This involves transmission or conversion of the radial inward motion to be transmitted in a form that results in a distally extending axial or longitudinal motion or displacement 50. This dynamic interaction between the solid wall of the tube 114 with the liquid at the aperture 136 causes an ejection of a droplet 12 of a predetermined size from the aperture 136. Stated differently, or in other words, or explained differently, transmission of acoustic pressure to the fluid or liquid in the region of the aperture plate 118, is at least partially responsible, for the propulsion or ejection of droplets 12 of fluid or liquid 134 through the aperture or outlet orifice 136.

Thus, the pressure or stress wave passing longitudinally through the tube wall provides a unique axial displacement of the distal tube tip 42, aperture plate 118 and/or aperture 136 for dispensing of single droplets 12. In some embodiments, this wave has a generally sinusoidal or cosine waveform, profile or configuration. After application of each pulse, the piezoelectric actuator, transducer or element 126 radially expands and axially contracts back to its original size thereby involving an oscillation or oscillatory motion of the tube tip 42.

The fluid or liquid 134 level 103 in the tube 114 may be at any point above or below the clamping area 132. With respect to the liquid level 103 being below the clamping area 132 and/or the piezoelectric actuator, provides a major advantage over conventional piezoelectric dispensing technology, wherein the liquid level has to be at least at the level of the piezoelectric or higher. Again, this translates into the advantages of the unique features of at least the longitudinal transducer 140 wherein transmission or conversion of radial motion to axial motion provides a new dimension of control for accurately dispensing predetermined quantities of fluid in the form of single droplets from a distal tip of the dispenser.

Desirably, in accordance with some embodiments, prior to droplet ejection, the balance between the hydrostatic pressure head, surface tension and capillary forces maintains the liquid 134 within the lumen of the tube 114 and substantially no liquid is adhesively suspended from the aperture or outlet orifice 136. The hydrostatic pressure head can be controlled, as needed or desired. (Optionally, the tube 114 can be open to the atmosphere or ambient conditions, as needed or desired.)

Accordingly, following each use the tube 114 may be removed and replaced by releasing preloading screw 128. The tube 114 may be disposed following each use, such as with a particular liquid, therefore eliminating the need for cleaning and the risk of contamination from material left over from a prior use.

In some embodiments, the tube 114 comprises glass. In some embodiments, the tube 114 comprises another rigid material that has a predetermined or preselected modulus of elasticity. In one embodiment, the material forming the tube 114 has a modulus of elasticity greater than about 10 GPa. In one embodiment, the material forming the tube 114 has a module of elasticity greater than about 50 GPa. A higher module of elasticity produces higher stress in the tube wall since the stress is a product of the elasticity and the deformation. This higher stress desirably results in a higher amplitude of oscillation of the capillary tube 114.

The capillary tube assembly 110 can comprise a sleeve 138 or the like that substantially surrounds or circumscribes the tube 114. The sleeve 138 desirably distributes the force imposed by the piezoelectric actuator, transducer or element 126 and prevents stress concentration locally or in one spot which may cause breakage of the tube 114, such as one made of glass, other rigid material or the like.

The sleeve 138 can comprise a variety of suitable materials. In one embodiment, the sleeve 138 is made of a metal or alloy such as stainless steel, brass or aluminum, or the like, among others. In another embodiment, the sleeve 138 is made of a plastic such as Delrin®, or the like, among others.

The sleeve 138 is bonded to the capillary tube 114 by a structural epoxy such as, but not limited to, LOCTITE® Hysol® type E-30CL. Thus, the capillary tube assembly 110 comprising the tube 114 and the sleeve 138 is separable from the dispenser 100 and disposable.

The aperture plate 118 can, in some embodiments, be bonded to the tube 114 and can be manufactured by electroforming. In one embodiment, the nozzle aperture plate 118 comprises or is made of electroformed nickel or electroformed palladium nickel. Optionally, the aperture plate 118 may be plated by inert material such as titanium nitride or the like with efficacy, as needed or desired. In one embodiment, the aperture plate 118 comprises synthetic sapphire, ruby or the like. The aperture plate 118 may be gold plated. In one embodiment, the thickness of the aperture plate 118 can be in the range of about 60 microns (μm), though higher or lower thicknesses may be efficaciously utilized, as required or desired.

As shown in the drawings, in some embodiments, the aperture plate 118 has a funnel-like, conical, frusto-conical structure or the like with a curvature that defines a first larger size or diameter at an upstream end and a second smaller size or diameter at a downstream end, that is, at the aperture or outlet orifice 136. Advantageously, such a configuration can provide improved consistency in control of the droplet size and mitigation of "dead" fluid spots or regions. Moreover, this desirably results in improved overall system operation.

The piezoelectric or piezoceramic actuator, transducer or element 126 can comprise a co-fired monolithic linear or longitudinal stack which expands and contracts, generally linearly or longitudinally in the direction of the stack, under the input of an alternating voltage. In one embodiment, the piezoelectric or piezoceramic actuator, transducer or element 126 is manufactured by NEC part No. AE0203D04Fas sold by THORLAB. Inc, Newton, N.J., U.S.A.

The clamping or preloading force of the piezoelectric actuator 126 can be varied based on the input voltage signal as well as the configuration of the piezoelectric device itself. In one embodiment, the maximum clamping force of the actuator 126 is in the range of about 200 Newton, though clamping forces below about 2 Newton and above about 250 Newton may be efficaciously utilized, as required or desired.

The clamping or preloading force of the clamping screw 128 can be varied based on the device and screw configuration. In one embodiment, the clamping screw 128 provides a preloading or clamping force of in the range from about 30 Newton to about 70 Newton, including all valued and sub-ranges therebetween, though higher or lower forces may be provided, as needed or desired. The screw 128 can be locked using a torque limiting screw driver which limits the linear force to a predetermined value, such as, but not limited to 70 Newton.

As discussed above with particular reference to FIG. 1A, the dispenser 100 may be used to acquire fluid or liquid samples as well as dispense fluid or liquid droplets. Acquiring samples is done by submerging the capillary tube 114 in a fluid sample and applying vacuum, suction or the like.

Capillary tube 114 has a generally tubular axis-symmetric shape with a generally thin wall having a thickness T as labeled in FIG. 2. In one embodiment, the thickness T is in the range from about 0.1 mm to about 0.5 mm, including all values and sub-ranges therebetween. In one embodiment, the length of the capillary tube 114 is about 25 mm and the distance of the tube aperture from the clamping point, location or region is desirably greater than about 13 mm such that the capillary tube can be conveniently submerged in a standard laboratory 10 mm deep well plate. Of course, these dimensions can be efficaciously modified to accommodate differently configured well plates, micro-titer plates and the like, among others, as required or desired.

In another embodiment, the thickness T is in the range from about 0.1 mm to about 0.3 mm, including all values and sub-ranges therebetween. Of course, higher or lower tube wall thicknesses may be provided with efficacy, as needed or desired. Advantageously, in accordance with certain embodiments, the generally thin wall structure of the capillary tube 114 allows for the piezo-induced stress to be substantially transmitted to the tube wall in a longitudinal manner as opposed to into the liquid therein, thereby providing additional control on the droplet ejection and the goal of achieving droplet sizes in the low picoliter range. Moreover, the relatively thin tube wall allows for a low piezoelectric force to be applied thereat such that the low force creates a sufficiently high tube wall stress or pressure with a low radial tube bending and a controlled axial tube displacement or oscillation, while minimizing transmission of compression pressure/stress to the liquid in the tube at the region of application of the radial force.

Typically, the tube 114 and its lumen have a generally circular cross-section. However, the cross-section of the tube 114 and its lumen may have other shapes, such as, but not limited to square or hexagonal cross sectional shapes.

In one embodiment, the tube 114 may have two unequal outer diameters at each end labeled D1 and D2 in FIG. 2 with D2 being greater than D1. In another embodiment, the tube 114 may have an even diameter through its length. Diameter D1 may be in the range from about 1 mm to about 5 mm and diameter D2 is generally smaller than about 9 mm. Of course, larger or smaller diameters may be provided with efficacy, as needed or desired. In some embodiments, larger opening or diameter D2 may be used for storage of fluid or liquid sample, such as DNA samples, as discussed further below.

In one embodiment, an alternating electrical signal at a frequency in the range from about 10 Kilohertz (KHz) to about 100 KHz is provided to the piezoelectric or piezoceramic actuator, transducer or element 126 to produce ejection of single droplets from the produces ejection of droplets 12 from the nozzle aperture plate 118. In other embodiments, higher or lower frequencies may be utilized with efficacy, as needed or desired.

The time of actuation (or expansion) of the piezoelectric or piezoceramic actuator, transducer or element 126 depends on various factors, such as, but not limited to, the system or device configuration, dimensioning and droplet size. In some embodiments, this time is of the order of a microsecond (μsecond) up to about in the range of tens or hundreds of microseconds (μseconds), as required or desired. Of course, higher or lower actuation times may be utilized with efficacy.

Typically, a single oscillation cycle ejects a single droplet 12 which has a droplet diameter that is substantially equal to the diameter of the aperture or outlet orifice 136. Thus for example, a 50 micron (μm) aperture size or diameter produces a droplet with a diameter of about 50 microns (μm) and having a volume of about 65 picoliters (pL). Similarly, an aperture of 70 μm produces a droplet with a volume of about 180 pL.

Fluids or liquids can be dispensed one droplet or drop at a time in a "drop-on-demand" mode at frequencies up to and in the range of about 1,000 drops per second. The dispensing device or dispenser 10) may be used in the production of arrays, such as DNA microarrays and the like, and multiple assays. The placement of the droplets 12 on a target or substrate can be controlled, for example, by a programmable positioning table which may move along the three axis (X, Y and/or Z) of a Cartesian or equivalent coordinate system, as discussed above and with particular reference to FIG. 1A.

FIG. 4 illustrates a more detailed top view of the clamping area of the tube 114 and engaging structural portions 142 and 144 of respective jaws or arms 122, 124. This drawing also shows the tube 114, the piezoelectric device 126, the clamping screw 128, and the sleeve 138. In one embodiment and as illustrated, the clamping jaw portions 142 and 144 have a generally V shape and which have four interface points P1, P2, P3 and P4 with the sleeve 138. This configuration can advantageously contribute to and enhance a generally balanced and even distribution of the stress in the clamped region of the tube 114.

The angle of the "V" shape may be efficaciously varied such that it can be greater or less than a right-angle (90 degrees) configuration. The number of interface points may also be varied, as needed or desired.

Clamping jaw portions 142 and 144 may optionally have a curved, arced or arcuate shape with a radius of curvature that is equal to or greater than the radius of (curvature) of the sleeve 138. Of course, other configurations may be practiced in accordance with embodiments of the invention disclosed, taught or suggested herein. Arrows 146 and 148 schematically depict the clamping, preloading and/or piezo actuation forces.

Figure 5:
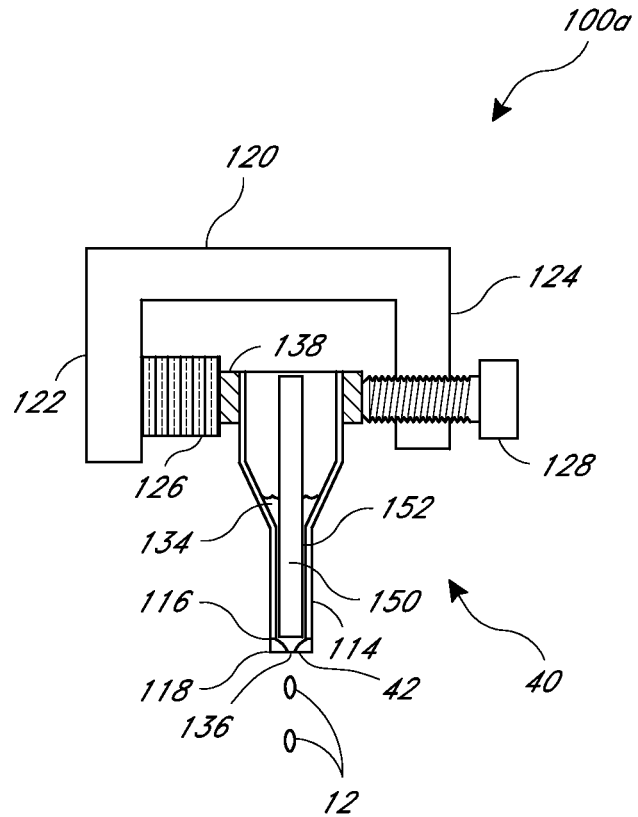
FIG. 5 is a simplified schematic side view of a piezoelectric fluid dispenser incorporating a tube with an annular gap illustrating features and advantages in accordance with certain embodiments of the invention.

FIG. 5 illustrates an arrangement of a piezoelectric dispensing device or dispenser 100a for fluid handling and transfer in accordance with some embodiments, with like reference numerals corresponding to like elements or structures, which utilize a capillary tube 114 with a generally annular gap 152. This annular gap 152 is provided between the tube 114 and a concentric core member 150 which would typically have, but not limited to, a cylindrical structure.

Many configurations and sizes of the gap 152 can be contemplated in accordance with embodiments of the dispenser 100a. For example, if the internal diameter of the tube 114 is about 1 mm, then the outer diameter of the core member 150 can be about 0.9 mm, thereby providing a radial gap of about 0.05 mm between the tube 114 and the core member 150 which defines the size of the annular capillary gap. One advantage of such an annular gap 152 configuration is that it can assist in reducing the hydrostatic pressure head that acts against or on the nozzle aperture plate 118 and/or the aperture or orifice outlet 136 relative to the capillary forces and surface tension involved. Desirably, this can result in more consistency, accuracy and reliability in dispensing of a particular or predetermined droplet size.

Moreover, the piezoelectric dispenser 100a further distinguishes over conventional devices which employ acoustic pressure wave propagation through the liquid for droplet dispensing. The droplet dispensing operation of the dispenser 100a is substantially independent of how the liquid 134 is loaded within the tube 114. At least one reason for this is that a longitudinal transducer 140 is utilized which converts radial tube motion to axial tube displacement at the distal tube tip 42 and/or the dynamic interaction between the solid wall of the tube 114 with the liquid at the aperture 136.

Figure 6:
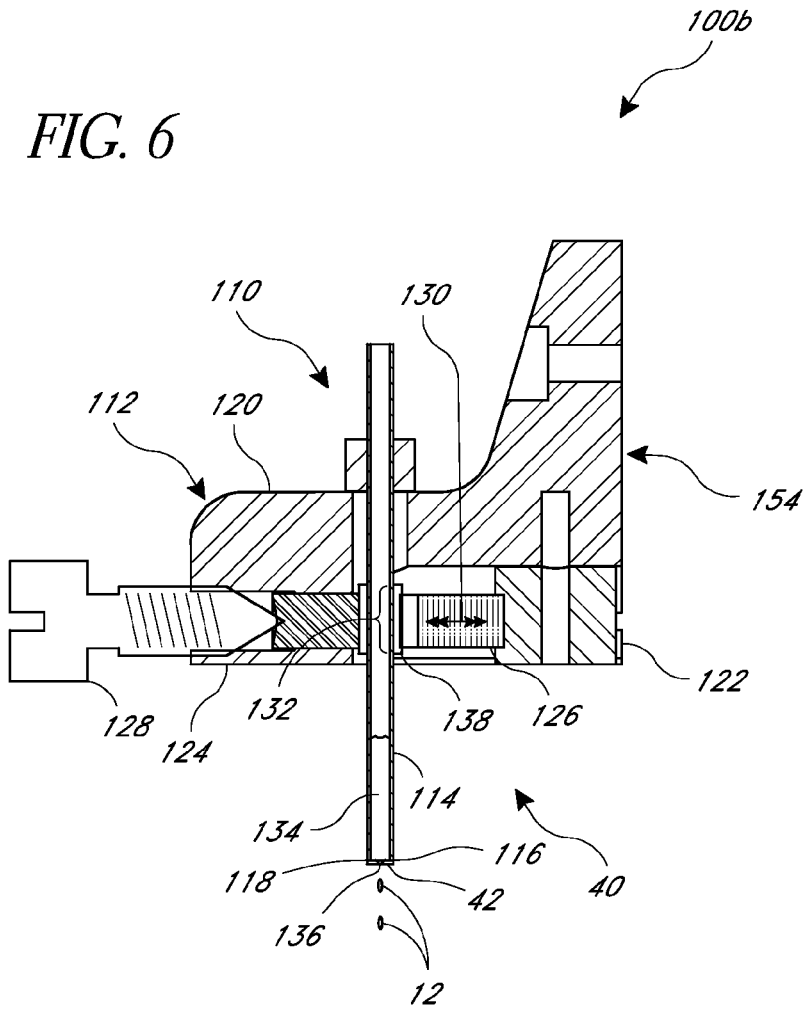
FIG. 6 is a simplified schematic side view of a piezoelectric fluid dispenser incorporating a mounting bracket suitable for dispensing of fluid in the production of dot arrays or the like illustrating features and advantages in accordance with certain embodiments of the invention.

FIG. 6 illustrates an arrangement of a piezoelectric dispensing device or dispenser 100b for fluid handling and transfer in accordance with some embodiments, with like reference numerals corresponding to like elements or structures, which utilize a main body portion or bracket 154 and that can be particularly advantageous in dispensing of fluids or liquids suitable for in production of dot arrays or assays, among other applications as disclosed, taught or suggested herein.

The dispensing device or dispenser 100b generally comprises a capillary tube assembly 110 that includes a tube 114 and a piezoelectric clamp assembly 112. The tube 114 includes a dispensing nozzle 116 generally defined by an aperture plate 118. The clamp assembly 112 can include a mounting bracket 120 that can be part of the main body portion 154 or incorporated therein. The bracket 120 has a first jaw or arm 122 that includes the piezoelectric or piezoceramic actuator, transducer or element 126 while a second jaw or arm 124 includes the preloading mechanism or screw 128. The screw 128 preloads the tube 114 against the piezoelectric device 126 such that the tube is desirably locked or fixtured in place between the piezoelectric device 126 and the screw 128 in a manner as is described herein. The main body portion 154 can have various structural features that allow for the assembly of the dispensing system including, but not limited to, connection, attachment and coupling devices or the like, among others.

As taught herein, the piezoelectric device 126 expands and contracts in the direction 130 in response to an alternating electrical voltage which, in accordance with certain embodiments, can be in the range of about 50 volts (such as in the range from, but not limited to, about 59 or less to about 62 or more volts) at a frequency of about 30,000 Hertz (Hz). This displacement of the piezoelectric actuator, transducer or element 126 produces one or more pulses of force in the radial direction 130 toward the tube 114. This force produces stress in the clamping region 132 of the capillary tube 114. This stress generates a wave which propagates longitudinally through the tube wall toward the nozzle aperture plate 118 wherein transmission of acoustic pressure to the fluid or liquid 134 in the region of the aperture plate 118 (via solid-fluid/liquid interaction) propels a droplet 12 of fluid through the aperture or outlet orifice 136. As also discussed above and herein, the stress/pressure wave passing longitudinally through the tube wall provides a unique oscillating distal tube tip 42, aperture plate 118 and/or aperture 136. In some embodiments, this wave has a generally sinusoidal or cosine waveform, profile or configuration.

Figure 7:
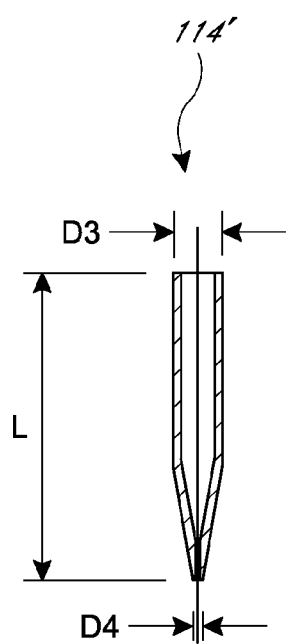
FIG. 7 is a simplified schematic side view of a capillary tube of a piezoelectric fluid dispenser illustrating features and advantages in accordance with certain embodiments of the invention.

FIG. 7 illustrates another embodiment of a capillary tube 114' which may be used in conjunction of any of the dispensing systems and dispensers as disclosed, taught or suggested herein, as suitable, and as needed or desired. The tube 114' of this embodiment comprises or is made of a high alumina ceramic material. The tube 114' can have a shank diameter D3 of about $1/16^{th}$ of an inch, a length L of about 1 inch and an orifice diameter of about 0.003 inches.

Figure 8:
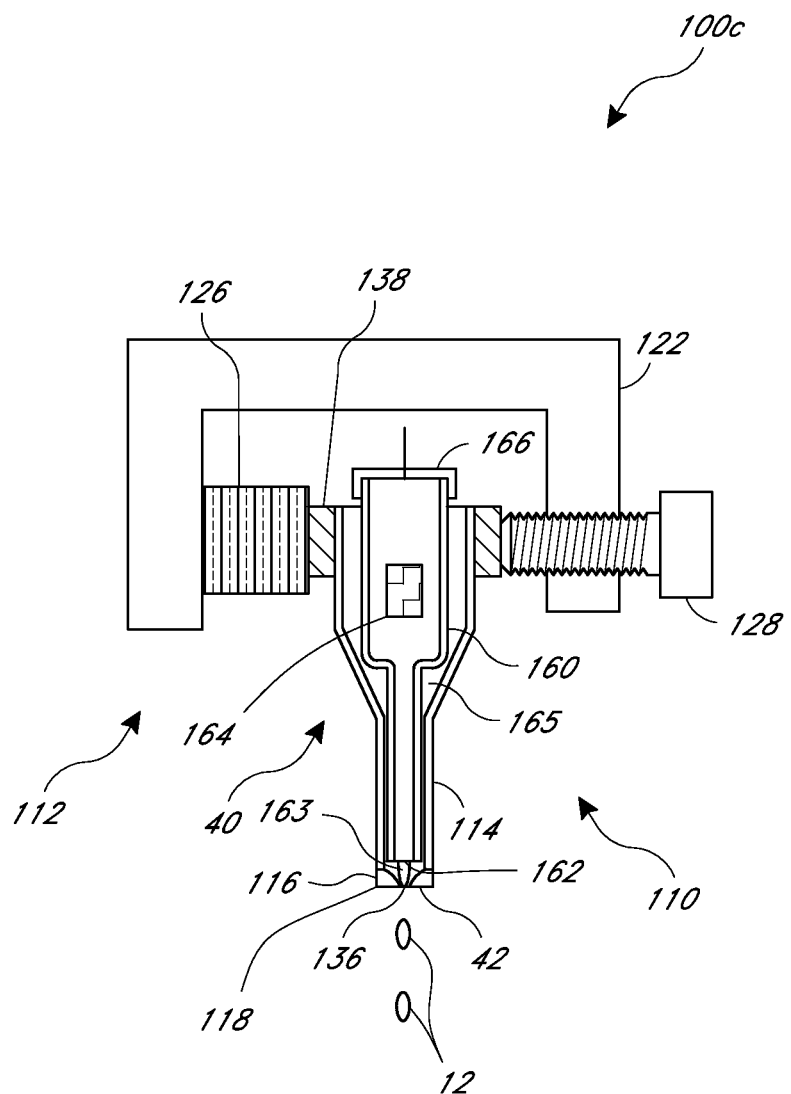
FIG. 8 is a simplified schematic side view of a piezoelectric fluid dispenser incorporating one or more stored fluid samples within a capillary tube illustrating features and advantages in accordance with certain embodiments of the invention.

FIG. 8 illustrates an arrangement of a piezoelectric dispensing device or dispenser 100c for fluid handling and transfer in accordance with some embodiments, with like reference numerals corresponding to like elements or structures, which can advantageously be used for storing and transporting pre-filled samples 164 of liquids, as disclosed or suggested herein, in generally sealed and sterile conditions and ambience within a container or tube assembly 160 that can be replaceable, removable and disposable. These embodiments provide a plurality of advantages wherein multiple liquids, such as chemical and biological reagents, may be utilized in an efficient and economical manner, given the unique nature of the replaceable features, in conjunction with a piezoelectric assembly 112 and device 126 that is reusable while the capillary tube assembly 110 is replaceable. Accordingly, a library of liquids and/or samples 164 can be stored in a multiple format of various containers or vessels 160 and retrieved and utilized efficaciously, as required or desired.

As such, in accordance with certain embodiments, the tube assembly 110 along with the vial containers 164 are readily replaceable. This provides a new dimension of handling and transferring liquids in a convenient, efficient and user-friendly environment. Also, and again, this advantageously not only mitigates the possibility of cross contamination of fluids but desirably and additionally provides an economical and cost effective approach with reuse of the piezoelectric actuator or transducer for further operation such as with a variety of liquids to be dispensed and transferred.

In accordance with certain embodiments, sample(s) 164 is stored inside a separate container (e.g., container 160) which is placed, positioned or disposed inside the tube 114 such that its opening 162 is in close proximity to and/or in fluid communication with the aperture plate 118 and/or the aperture or outlet orifice 134. This can involve that a liquid meniscus 163, comprising a liquid to be dispensed from the container 160 is in close proximity to and/or in fluid communication with the aperture plate 118 and/or the aperture or outlet orifice 134. It is important to note that the space or volume 165 does not contain the liquid to be dispensed and typically can comprise a free space such as containing air.

Actuation of the piezoelectric dispenser 100c and/or the longitudinal transducer 40 causes transmission or conversion of radial tube motion into axial tube motion at the tip 42 and causes, at least partially due to the solid-liquid dynamic interaction, to eject droplets 12. It should be noted that conventional piezoelectric technology wherein acoustic pressure is directly transmitted to the liquid to be dispensed, can simply not achieve the advantages provided by at least the dispensing operations employed by the embodiments of FIG. 8.

Container 160 is desirably provided with a cup 166 or the like for sealing its top opening and a second cup (not shown) for sealing its outlet opening 162. Other methods of container closures such as Blow-Fill-Seal are common in aseptic packaging and may be used in conjunction with these embodiments of the invention, such as the dispenser 100c.

In some embodiments, the vial with stored fluid or liquid can comprise the tube assembly 110 which is attached or connected to the dispenser 100c, and used to dispense a particular liquid or reagent, and then simply removed and replaced by another tube assembly 110 with the a different or same fluid. Thus, these embodiments can provide storage vials or tubes 114 with bonded sleeves 138 that are part of a library of the same for usage as needed or desired.

As such, in accordance with certain embodiments, advantageously a cost-effective, efficient and reliable (e.g., substantially eliminating the risk of cross contamination) is provided. The vials or tube assemblies 110 can have tracking numbers, barcodes or the like to identify the particular liquid stored therein and the specific volume of the liquid can be tailored to a specific application. Again, and desirably, such pre-filled vials, vessels or tube assemblies allow for a removable, separable and disposable arrangement while maintaining the integrity and reusability of the dispenser 100c which employs relatively expensive componentry such as, but not limited to, the piezoelectric device 126.

Accordingly, from a commercial standpoint, the pre-filled vials or tube assemblies 110 can be provided as needed or desired and can simply connect to the dispenser 100c and then disposed and replaced. The pre-filled vials or tube assemblies 110 provide a storage means that allows for them to be used at a later date as needed. Advantageously, this storage can provide for long term accessibility and thus not cause delays when a particular reagent or liquid is required within a short period.

In one embodiment, the container comprises or is made of polypropylene. Advantageously, polypropylene can eliminate the need for a coating, in accordance with certain embodiments and applications, wherein such coatings are commonly used for protein immobilizing. Such coatings are described in U.S. Pat. Nos. 6,852,851, 5,650,506 and 5,447,864.

Figure 9:
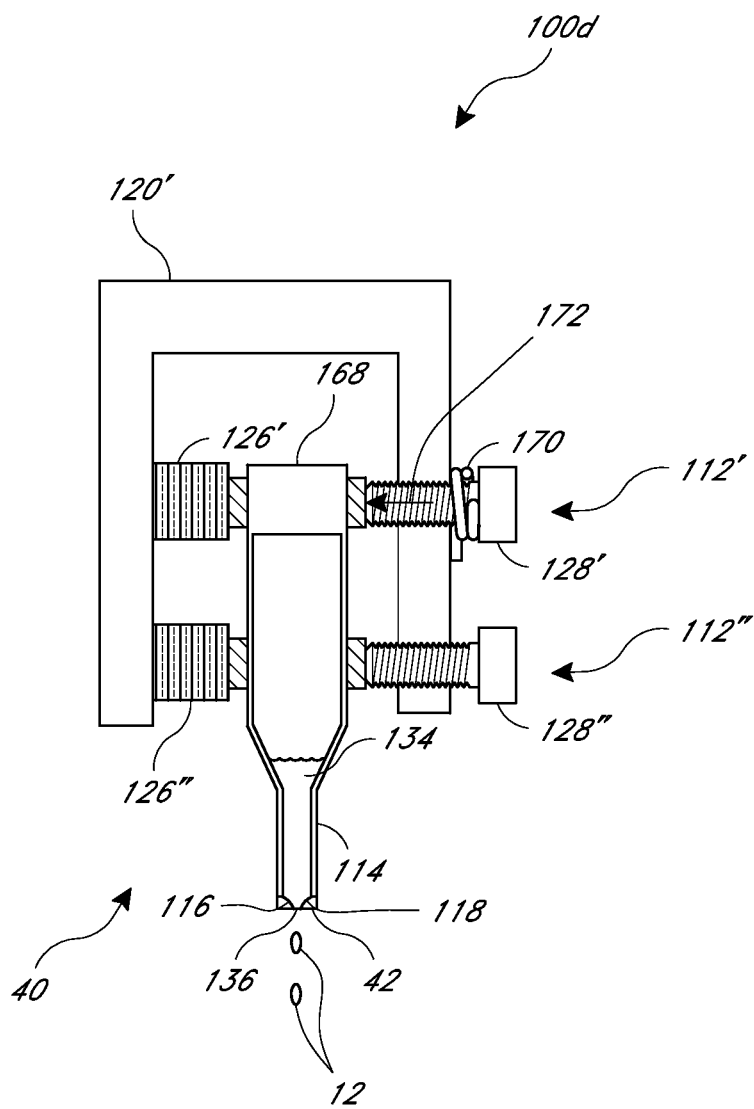
FIG. 9 is a simplified schematic side view of a piezoelectric fluid dispenser with multiple clamping devices illustrating features and advantages in accordance with certain embodiments of the invention.
Figure 10:
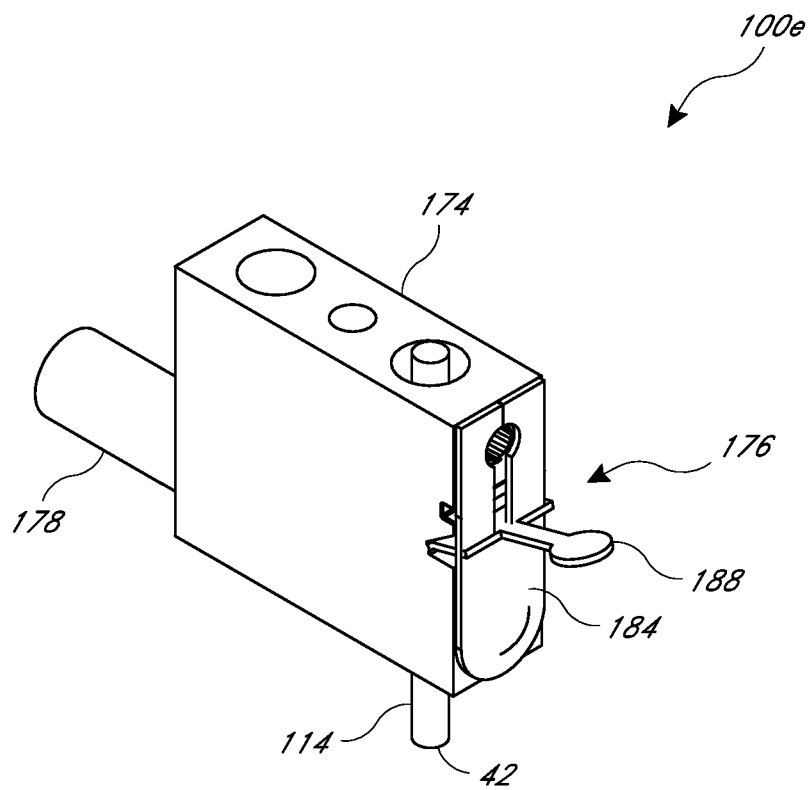
FIG. 10 is a simplified perspective view of a piezoelectric fluid dispenser incorporating a spring biased preloading mechanism illustrating features and advantages in accordance with certain embodiments of the invention.
Figure 11:
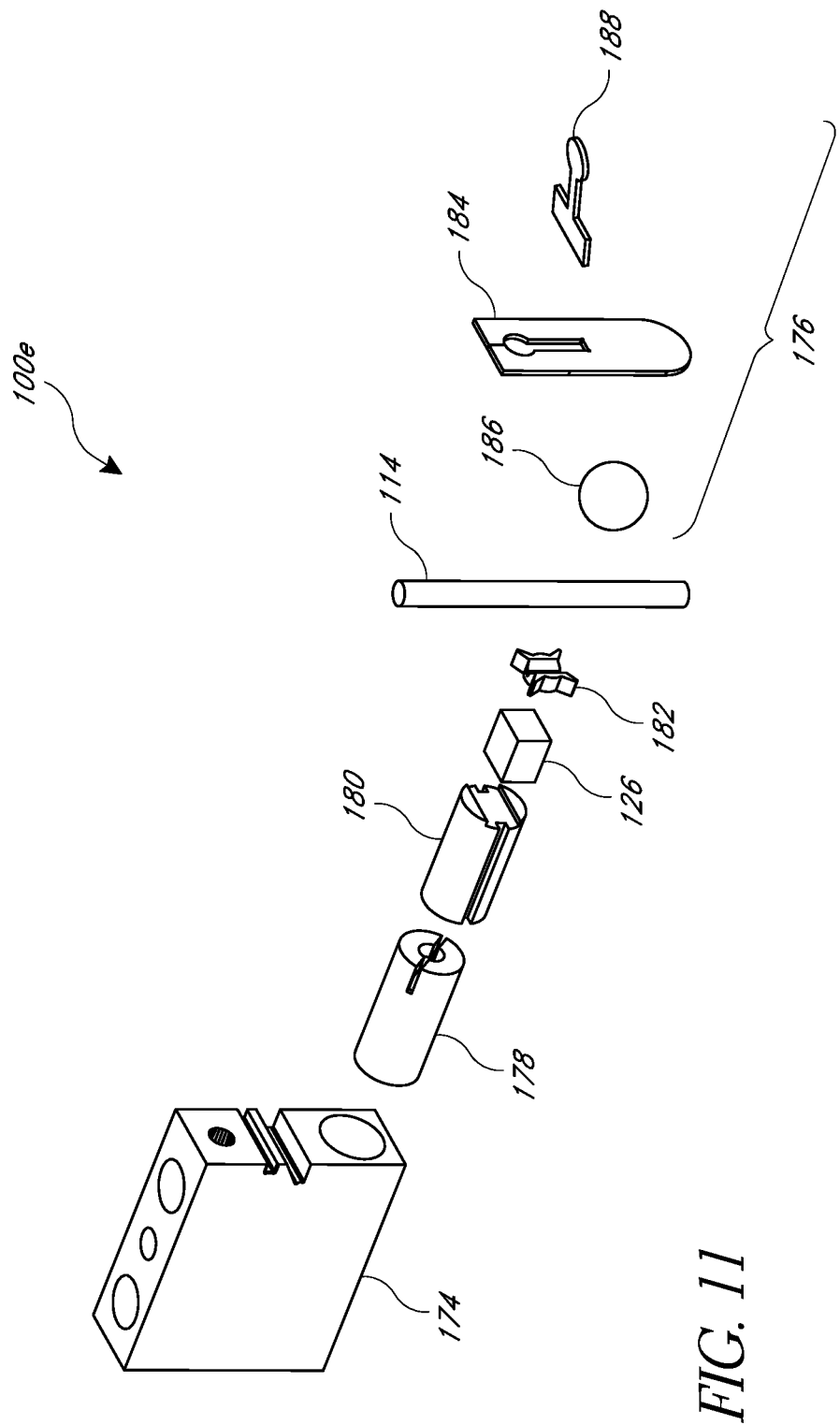
FIG. 11 is a simplified exploded perspective view of the piezoelectric fluid dispenser of FIG. 10 illustrating features and advantages in accordance with certain embodiments of the invention.
Figure 12:
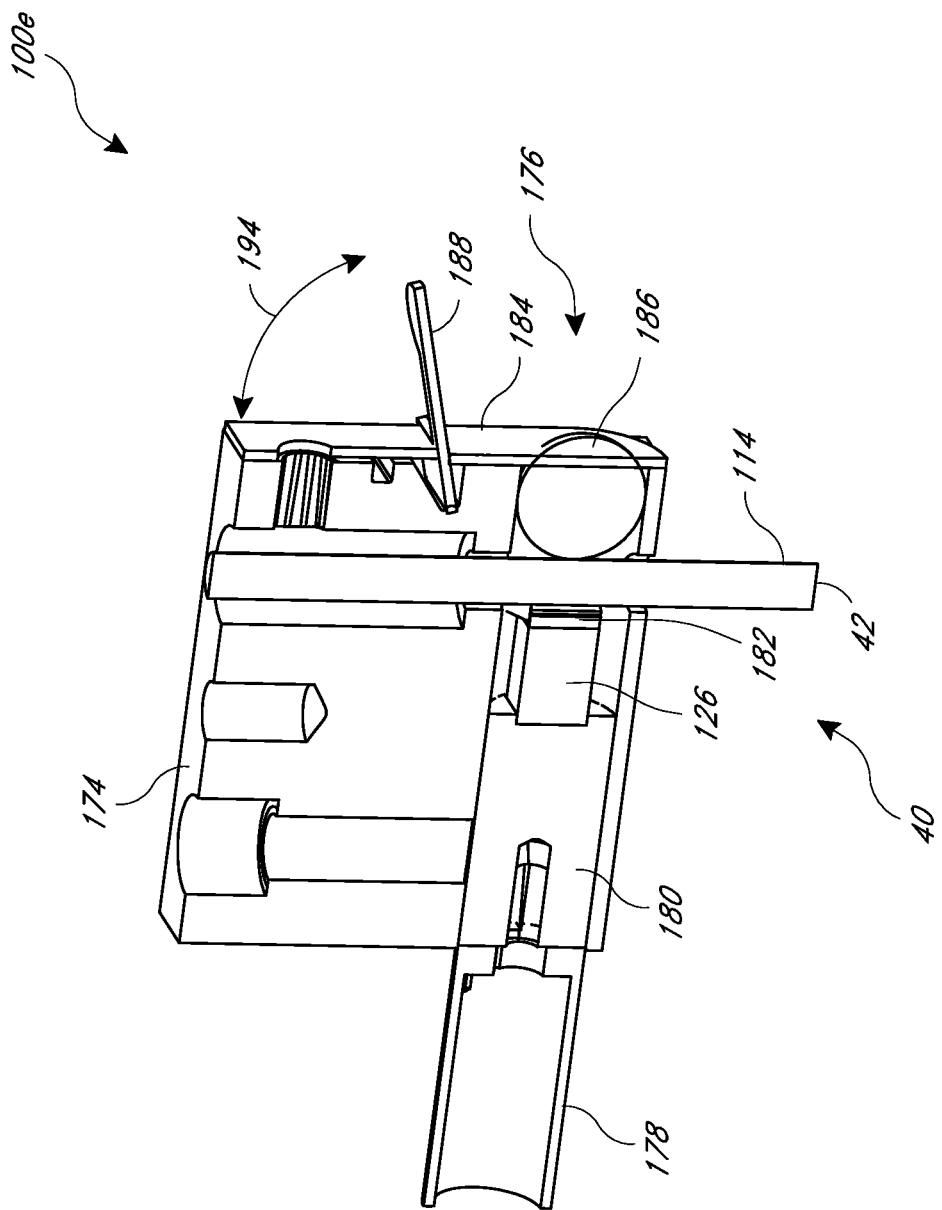
FIG. 12 is a simplified sectional perspective view of the piezoelectric fluid dispenser of FIG. 10 illustrating features and advantages in accordance with certain embodiments of the invention.

FIG. 9 illustrates an arrangement of a piezoelectric dispensing device or dispenser 100d for fluid handling and transfer in accordance with some embodiments, with like reference numerals corresponding to like elements or structures, which include a plurality or multiplicity of piezoelectric clamps or assemblies, such as 112' and 112". The dispenser or dispensing device 100d and/or the respective assemblies 112' and 112" generally comprise two sets of piezoelectric clamps, elements, transducers or elements 126', 126" which are operatively coupled to respective two preloading clamping screws 128', 128". A bracket or main body portion 120' comprises part of the device.

The piezoelectric dispensing device or dispenser 100d includes the tube 114 which is closed at one end 168 and forms a shape of a vial (e.g., comprising glass) which can be used for storage of fluid or liquid samples.

In some embodiments, the screw 126' can be provided with a resilient member such as a spring 170, for example, a torsion spring or the like. The torsion spring 170 can be biased in a clockwise direction, or alternatively a counter-clockwise direction, to apply a substantially constant torque on the screw 112' such that the radial (or axial if viewed relative to a X-Y-Z Cartesian coordinate system)/force 172 applied by the screw 128' remains substantially constant during operation of the dispensing device or dispenser 100d.

Advantageously, the torsion spring 170 can prevent accidental damage which may be caused by manually over tightening of the screw 128". In one embodiment, but not limited to, an M5-0.8 screw may be used in conjunction with the torsion spring 170 to apply a predetermined torque, for example, of about 0.03 Nm in a clockwise direction to produce a radial/linear force 172 of about 70 Newton.

FIGS. 10-13 illustrate different views and/or arrangements of a piezoelectric dispensing device or dispenser 100e for fluid handling and transfer in accordance with some embodiments. The dispenser 100e generally comprises a main body portion or bracket 174, a capillary tube 114, a piezoelectric actuator, transducer or element 126, and a preloading, clamping, retaining or biasing mechanism, device, assembly or structure 176 that can clamp the linear or longitudinal piezoelectric actuator 126 to the tube 114.

The dispenser 100e further comprises a connector sleeve 178 that is coupled to or engaged with a pin 180 or the like which in turn is coupled to or engaged with one end of the piezoelectric actuator, transducer or element 126. The other end of the piezoelectric actuator, transducer or element 126 is coupled to or engaged with a pad or sleeve 182 or the like which in turn is coupled to or engaged with the tube 114. The pad or sleeve 182 can be bonded to the tube 114 and in combination advantageously provides for a replaceable, removable and disposable unit.

The main body portion or bracket 174 houses and/or supports the various dispenser components. Various clearance spaces and openings can be provided to allow for positioning of the components and passage of wires or cables and the like. The pad or sleeve 182 can be formed by various methods, such as, but not limited to, electrical discharge machining (EDM).

Figure 13:
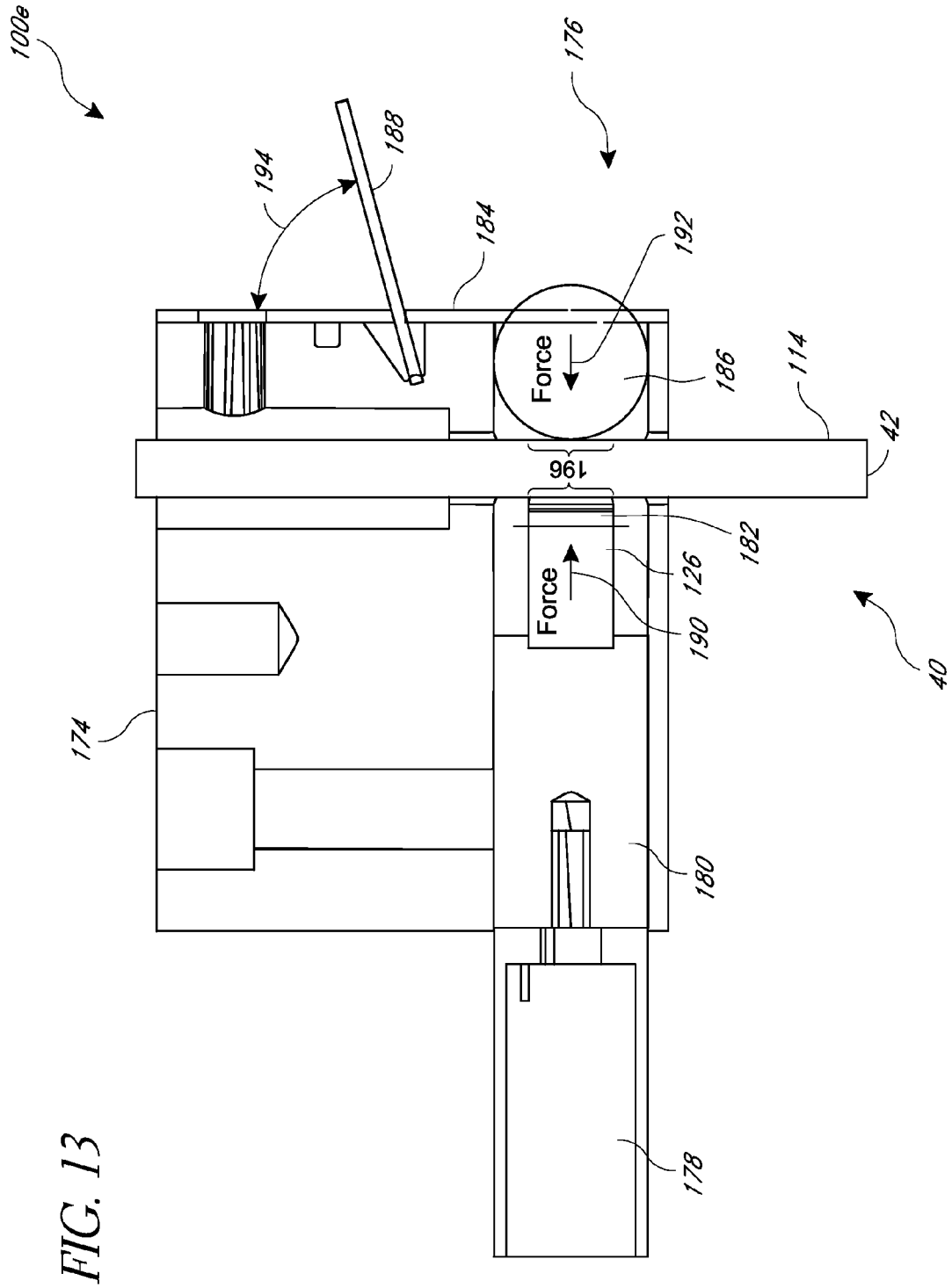
FIG. 13 is a simplified sectional side view of the piezoelectric fluid dispenser of FIG. 10 illustrating features and advantages in accordance with certain embodiments of the invention.

The preloading, clamping, retaining or biasing mechanism, device, assembly or structure 176 generally comprises a spring 184, such as a leaf spring coupled to a mass ball 186 and an actuation arm or lever 188 to provide preloading or clamping on a portion of the tube 114 that is opposed to the piezoelectric actuator, transducer or element 126. The radial forces are shown in FIG. 13 as arrows 190 and 192. The motion of the arm or lever 188 in directions 194 causes the leaf spring to apply and release a force on the mass ball 186 which in turn selectively applies a force on the clamped region 196 of the tube 114. Desirably, the mass ball 186 provides a reactive opposing force in response to the actuation force of the piezoelectric actuator, transducer or element 126. The mass ball 186 may comprise a magnet for coupling with, for example, the leaf spring 184, such that in some embodiments it would provide clearance space for removal and replacement of the dispensing capillary tube 114.

The preloading, clamping, retaining or biasing mechanism, device, assembly or structure 176 of the dispenser 100e can be efficaciously employed with any of the dispensing systems and devices disclosed, taught or suggested herein. The operation of the piezoelectric actuator, transducer or element 126 of the dispenser 100e is similar to as described above and herein.

It should be noted that, in accordance with embodiments of the piezoelectric dispenser disclosed herein, the piezoelectric device 126 does not completely surround, encircle or circumscribe the outer periphery of the dispensing tube 114, but does so only partially. Stated otherwise, the piezoelectric device is on a first side of the tube while the preloading device is on a second substantially opposed second side of the tube. In any of the embodiments disclosed herein, the piezoelectric device can comprise a linear or longitudinal transducer 126 that is clamped to the capillary tube 114.

The systems, devices, methods and techniques disclosed or suggested herein have various industrial applications. These may be used for dispensing and aspiration of any fluid, which has a viscosity, but not limited to, in the range of about 1 cps to about 30 cps, including all ranges and sub-ranges therebetween. The nozzle aperture plate may have one aperture or a plurality or multiplicity of apertures or outlet orifices.

The size or diameter of the aperture or outlet orifice may be in the range from about 5 microns (μm) or less to about 150 microns (μm) or more. In some embodiments, apertures or outlet orifices that have a size or diameter in the range from about 5 microns (μm) to about 10 microns (μm) can generally produces fine droplets which may be used in the production of a wide variety of aerosol and sprays of various chemical, biological or pharmaceutical materials and liquids.

In one embodiment, the dispensing device or dispenser as disclosed herein may be used as a hand held writing instrument such as an air brush instrument. In this embodiment, the tube may be filled with ink, coloring fluid(s), liquid(s) or the like. In another embodiment, the dispensing tube may comprise a hypodermic needle for delivery of local anesthetic into inflated abdominal space prior to or during a laparoscopy surgical procedure.

Any of the methods which are described and illustrated herein are not limited to the sequence of acts described, nor are they necessarily limited to the practice of all of the acts set forth. Other sequences of acts, or less than all of the acts, or simultaneous occurrence of the acts, may be utilized in practicing embodiments of the invention.

It is to be understood that any range of values disclosed, taught or suggested herein comprises all values and subranges therebetween. For example, a range from 5 to 10 will comprise all numerical values between 5 and 10 and all subranges between 5 and 10.

From the foregoing description, it will be appreciated that a novel approach for dispensing (and aspirating) of microvolumes of fluids has been disclosed. While the components, techniques and aspects of the invention have been described with a certain degree of particularity, it is manifest that many changes may be made in the specific designs, constructions and methodology herein above described without departing from the spirit and scope of this disclosure.

While a number of preferred embodiments of the invention and variations thereof have been described in detail, other modifications and methods of using and diagnostic, assaying, arraying, medical, biotech and printing applications for the same will be apparent to those of skill in the art. Accordingly, it should be understood that various applications, modifications, and substitutions may be made of equivalents without departing from the spirit of the invention or the scope of the claims.

Various modifications and applications of the invention may occur to those who are skilled in the art, without departing from the true spirit or scope of the invention. It should be understood that the invention is not limited to the embodiments set forth herein for purposes of exemplification, but is to be defined only by a fair reading of the appended claims, including the full range of equivalency to which each element thereof is entitled.

What is claimed is:

1. A longitudinal transducer for converting a radial displacement to an axial displacement, comprising:
- a tube having a length, a wall with a thickness, a lumen, and a tip at a distal end of the tube;
- a linear or longitudinal piezoelectric actuator clamped to the tube at a location proximal of the tip, a generally V-shaped jaw configuration being used to couple the piezoelectric actuator to the tube; and
- an energy source configured to provide at least one voltage pulse to the piezoelectric actuator;
- wherein actuation of the piezoelectric actuator causes a pressure wave to propagate along the tube wall from said location of the tube toward the tip of the tube such that radial motion at said location of the tube is transmitted as distally extending axial motion of the tip of the tube.

2. The longitudinal transducer of claim 1, wherein the distal end has an aperture defined by sapphire.

3. The longitudinal transducer of claim 1, wherein the energy source comprises a resistor arrangement.

4. A dispenser for transferring a predetermined quantity of a liquid, comprising:
- a longitudinal transducer, comprising:
  - a tube having a length, a wall with a thickness, a lumen, and a tip at a distal end of the tube; and
  - a piezoelectric actuator operatively coupled to the tube at a location proximal of the tip, a generally V-shaped jaw configuration being used to couple the piezoelectric actuator to the tube;
- an aperture at the tip of the tube; and
- a liquid to be dispensed into or onto one or more targets and being loaded within the tube;
- wherein actuation of the piezoelectric actuator causes a pressure wave to propagate along the tube wall from said location of the tube toward the tip of the tube such that radial motion at said location of the tube is transmitted as distally extending axial motion of the tip of the tube, thereby causing a droplet of a predetermined volume to be ejected from the aperture.

5. The dispenser of claim 4, wherein the piezoelectric actuator comprises a linear or longitudinal piezoelectric actuator that is clamped to the tube.

6. The dispenser of claim 4, wherein the dispenser further comprises an energy source configured to provide at least one voltage pulse to the piezoelectric actuator.

7. The dispenser of claim 4, wherein the tube and the piezoelectric actuator are separable.

8. The dispenser of claim 4, wherein a lumen of the tube has a generally annular configuration.

9. The dispenser of claim 4, in combination with a fluid source that allows acquisition of liquid to be dispensed by the dispenser from the source.

10. The dispenser of claim 4, wherein the aperture is defined by sapphire.

11. The dispenser of claim 4, wherein a sleeve is disposed between the tube and the jaw structure.

12. The dispenser of claim 11, wherein the jaw structure has four interface points with the sleeve.

13. The dispenser of claim 6, wherein the energy source comprises a resistor arrangement.

14. A method of transferring a predetermined quantity of a liquid, comprising:
   providing a tube with a liquid to be dispensed, the tube comprising a distal end with a tip and an aperture thereat;
   providing a piezoelectric actuator in communication with the tube at a location proximal to the tip of the tube, a generally V-shaped jaw configuration being used to couple the piezoelectric actuator to the tube;
   actuating the piezoelectric actuator such that a pressure wave propagates along said tube from said location of the tube toward the tip of the tube and radial motion at said location of the tube is transmitted as axial motion of the tip of the tube, thereby causing a droplet of a predetermined volume to be ejected from the aperture.

15. The method of claim 14, wherein the piezoelectric actuator comprises a linear or longitudinal piezoelectric actuator that is clamped to the tube.

16. The method of claim 14, wherein the method further comprises replacing the tube with another tube for dispensing of another liquid.

17. The method of claim 14, wherein the method further comprises acquiring the liquid to be dispensed from a fluid source.

18. The method of claim 14, wherein a lumen of the tube has a generally annular configuration.

19. The method of claim 14, wherein the piezoelectric actuator is positioned axially above the liquid in the tube.

20. The method of claim 14, wherein the aperture is defined by sapphire.

21. The method of claim 14, wherein a sleeve is disposed between the tube and the jaw structure.

22. The method of claim 14, wherein the jaw structure has multiple interface points with the tube.

23. A longitudinal transducer for converting a radial displacement to an axial displacement, comprising:
   a tube comprising a generally rigid material and having a length, a wall with a thickness, a lumen, and a tip at a distal end of the tube;
   the rigid material having a modulus of elasticity greater than about 10 GPa;
   a linear or longitudinal piezoelectric actuator clamped to the tube at a location proximal of the tip, a generally V-shaped jaw configuration being used to couple the piezoelectric actuator to the tube; and
   an energy source configured to provide at least one voltage pulse to the piezoelectric actuator;
   wherein actuation of the piezoelectric actuator causes a pressure wave to propagate from said location of the tube through the wall of the tube and toward the tip of the tube such that radial motion at said location of the tube is transmitted as distally extending axial motion of the tip of the tube.

24. The longitudinal transducer of claim 23, wherein the rigid material has a modulus of elasticity greater than about 50 GPa.

25. The longitudinal transducer of claim 23, wherein an aperture is at the tip of the tube and a liquid to be dispensed into or onto one or more targets, by the actuation of the piezoelectric actuator, is contained in the tube.

26. The longitudinal transducer of claim 25, wherein the tube and the piezoelectric actuator are separable.

27. The longitudinal transducer of claim 23, wherein the distal end has an aperture which is defined by sapphire.

28. The longitudinal transducer of claim 23, wherein the energy source comprises a resistor arrangement.

* * * * *

UNITED STATES PATENT AND TRADEMARK OFFICE
CERTIFICATE OF CORRECTION

PATENT NO. : 9,068,566 B2  
APPLICATION NO. : 13/355150  
DATED : June 30, 2015  
INVENTOR(S) : Yehuda Ivri Page 1 of 1

It is certified that error appears in the above-identified patent and that said Letters Patent is hereby corrected as shown below:

In the Specification

In column 4 at line 56, Change "device" to --device.--.

In column 7 at line 28, Change "actuator" to --actuator.--.

In column 10 at lines 13-14, Change "dispensed" to --dispensed.--.

In column 10 at line 58, Change "motion" to --motion.--.

In column 11 at line 14, Change "like" to --like.--.

In column 11 at line 16, Change "JetExpert" to --JetXpert--.

In column 15 at line 22, Change "AE0203d04Fas" to --AE0203d04F as--.

In column 15 at line 23, Change "THORLAB." to --THORLABS--.

In column 19 at line 28, Change "the a" to --a--.

Signed and Sealed this  
Twenty-eighth Day of June, 2016

Michelle K. Lee  
*Director of the United States Patent and Trademark Office*